(12) United States Patent
Ray

(10) Patent No.: US 10,324,167 B2
(45) Date of Patent: Jun. 18, 2019

(54) SYSTEMS AND METHODS FOR ADDING FUNCTIONAL GRID ELEMENTS TO STOCHASTIC SPARSE TREE GRIDS FOR SPATIAL FILTERING

(71) Applicant: THE BOEING COMPANY, Chicago, IL (US)

(72) Inventor: Gary Alan Ray, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 291 days.

(21) Appl. No.: 15/262,950

(22) Filed: Sep. 12, 2016

(65) Prior Publication Data
US 2018/0074169 A1    Mar. 15, 2018

(51) Int. Cl.
*G01S 5/02* (2010.01)
*G01S 5/12* (2006.01)
(Continued)

(52) U.S. Cl.
CPC .............. *G01S 7/2923* (2013.01); *G01S 5/02* (2013.01); *G01S 5/12* (2013.01); *G01S 7/046* (2013.01);
(Continued)

(58) Field of Classification Search
CPC . G01S 13/56; G01S 13/62; G01S 5/12; G01S 7/2923; G01S 13/878;
(Continued)

(56) References Cited

U.S. PATENT DOCUMENTS 5,179,529 A     1/1993   Nowakowski
5,263,051 A    11/1993   Eyuboglu
(Continued)

FOREIGN PATENT DOCUMENTS

EP    2988148 A1    2/2016
JP   2001264417 A    9/2001
(Continued)

OTHER PUBLICATIONS

EPO Extended Search Report for related application 17181686.1 dated Aug. 21, 2017, 9 pp.
(Continued)

*Primary Examiner* — Olumide Ajibade Akonai
(74) *Attorney, Agent, or Firm* — Armstrong Teasdale LLP

(57) ABSTRACT

A method of spatially filtering signal parameter vector data includes receiving, at a computing device, a first signal parameter vector at a first time and a second signal parameter vector at a second time occurring after the first time. The first and second signal parameter vectors are derived from a plurality of signals received at a sensor, and include first and second signal data blocks, respectively. The method also includes transmitting, to at least a first and second element of an array data structure representative of a physical spatial domain, the first and second signal data blocks, respectively, and determining an elliptical error region probability object having a center and a pair of axes containing the first and second signal data blocks. The center represents a highest probability location of a signal emitter at the second time and the pair of axes represents the spatial error of the center.

22 Claims, 10 Drawing Sheets

(51) Int. Cl.
G01S 7/04 (2006.01)
G01S 13/56 (2006.01)
G01S 13/62 (2006.01)
G01S 7/292 (2006.01)
G06F 16/29 (2019.01)
H04W 64/00 (2009.01)

(52) U.S. Cl.
CPC .............. *G01S 13/56* (2013.01); *G01S 13/62* (2013.01); *G06F 16/29* (2019.01); *H04W 64/00* (2013.01)

(58) Field of Classification Search
CPC .......... G01S 5/0278; G01S 7/006; G01S 5/02; G01S 13/003; G01S 13/723; G01S 13/726; G01S 15/876; G01S 2013/466; G01S 2013/468; G01S 2015/465; G01S 19/42; G01S 5/0252; G01C 21/00; G06F 17/18; H04W 64/00

See application file for complete search history.

(56) References Cited

U.S. PATENT DOCUMENTS

| | | | |
|---|---|---|---|
| 5,754,783 | A | 5/1998 | Mendelson et al. |
| 5,889,791 | A | 3/1999 | Yang |
| 5,999,129 | A | 12/1999 | Rose |
| 6,041,393 | A | 3/2000 | Hsu |
| 6,043,771 | A | 3/2000 | Clark |
| 6,147,646 | A | 11/2000 | Arneson et al. |
| 6,205,190 | B1 | 3/2001 | Antonio et al. |
| 6,285,319 | B1 | 9/2001 | Rose |
| 6,351,456 | B1 | 2/2002 | Struhsaker et al. |
| 6,545,633 | B1 * | 4/2003 | Jensen ................ G01S 13/003 342/118 |
| 6,711,528 | B2 | 3/2004 | Dishman et al. |
| 6,744,744 | B1 | 6/2004 | Tong et al. |
| 6,898,612 | B1 | 5/2005 | Parra et al. |
| 6,985,102 | B1 | 1/2006 | Horn et al. |
| 7,397,415 | B1 | 7/2008 | Wang et al. |
| 8,805,858 | B1 | 8/2014 | Ray |
| 8,958,750 | B1 | 2/2015 | Saleem et al. |
| 9,081,092 | B1 * | 7/2015 | Friesel ................. G01S 13/726 |
| 9,273,965 | B2 * | 3/2016 | Cody .................... G01C 21/00 |
| 2002/0035709 | A1 | 3/2002 | Chen et al. |
| 2002/0121890 | A1 | 9/2002 | Levitt |
| 2002/0168035 | A1 | 11/2002 | Carlson et al. |
| 2003/0023909 | A1 | 1/2003 | Ikeda et al. |
| 2003/0079170 | A1 | 4/2003 | Stewart et al. |
| 2003/0095716 | A1 | 5/2003 | Gindele et al. |
| 2003/0096586 | A1 | 5/2003 | Oates et al. |
| 2003/0221084 | A1 | 11/2003 | Zhou |
| 2004/0027257 | A1 | 2/2004 | Yannone et al. |
| 2004/0158821 | A1 | 8/2004 | Rickard et al. |
| 2004/0204922 | A1 | 10/2004 | Beadle et al. |
| 2008/0198914 | A1 | 8/2008 | Song |
| 2009/0060008 | A1 | 3/2009 | Beadle |
| 2010/0309055 | A1 | 12/2010 | Middour et al. |
| 2011/0178979 | A1 * | 7/2011 | Nakagawa ................ G01S 5/02 706/54 |
| 2012/0280848 | A1 | 11/2012 | Card et al. |
| 2013/0021197 | A1 | 1/2013 | Jiang |
| 2014/0354647 | A1 * | 12/2014 | Verret ..................... G06T 19/20 345/427 |
| 2016/0314097 | A1 * | 10/2016 | Bradford ................ G06F 17/18 |

FOREIGN PATENT DOCUMENTS

| | | |
|---|---|---|
| JP | 2015187575 A | 10/2015 |
| WO | 9858450 A1 | 12/1998 |

OTHER PUBLICATIONS

Extended European Search Report for Application No. 17174816.3, dated Jan. 9, 2018, 7 pages.
Extended European Search Report for Application No. 17179448.0, dated Jan. 19, 2018, 9 pages.
Jiang, L. et al., Pulse-Compression Radar Signal Sorting Using th Blind Source Separation Algrithms, 2015 International Conference on Estimation, Detection and Information Fusion, IEEE, pp. 268-271.
Shy, K. et al., Implementation of Pipelined FastICA on FPGA for Real-Time Blind Source Separation, Jun. 2008, IEEE Transaction on Neural Networks, vol. 19, No. 6, pp. 958-970.
Lan-Da Van, Pipelining and Parallel Processing, Department of Computer Science National ChiaoTung University, Taiwan, 2010.
EPO Extended Search Report for related application 17181675.4 dated Aug. 17, 2017, 11 pp.
Mark Wickert, ECE2610 Signals and Systems lecture notes, Chapter 8 IIR Filters, Apr. 19, 2010.
A. Kurzhanskiy & P. Varaiya, Ellipsoidal Toolbox Technical Report, 2006.
M. Friendly et al., Elliptical Insights: Understanding Statistical Methods through Elliptical Geometry, Statistical Science, vol. 28, No. 1, 1-39 (2013).
An FPGA Implementation of Incremental Clustering for Radar Pulse Deinterleaving, Scott Bailie, MS Thesis, Northeastern Univ., Apr. 2010.
S. Bailie & M. Leeser, Incremental applied to radar deinterleaving: a parameterized FPGA implementation, FPGA '12 Proceedings of the ACM/SIGDA international symposium on Field Programmable Gate Arrays, pp. 25-28, ISBN 978-1-4503-1155-7, abstract available at http://dl.acm.org/citation.cfm?id=2145699.
Pandu, J., Balaji, N., Naidu, C.D., FPGA implementation of multi parameter deinterleaving, 2014 International Conference on Electronics and Communications Systems (ICECS), Feb. 13-14, 2014, ISBN 978-1-4799-2320-5, abstract available at http://ieeexplore.ieee.org/document/6892676/.
Singh, A.K. & Rao, K.S., Detection, Identification & Classification of Intra Pulse Modulated LPI Radar Signal using Digital Receiver, International Journal of Emerging Technology and Advanced Engineering, vol. 2, Issue 9, Sep. 2012.
Kumar.N et al., Deinterleaving of Radar Signals and its Parameter Estimation in EW Environment, International Journal of Emerging Technology and Advanced Engineering, vol. 4, Issue 9, Sep. 2014.
Mahmoud et al., Radar Parameter Generation to Identify the Target, Journal of Engineering, vol. 17, Feb. 2011, available at http://www.iasj.net/iasj?func=fulltext&ald=24384.
Babcock et al., Sampling From a Moving Window Over Streaming Data, SODA '02 Proceedings of the thirteenth annual ACM-SIAM symposium on Discrete algorithms, pp. 633-634, abstract available at http://dl.acm.org/citation.cfm?id=545465.
Lakshmi et al., Detection and Extraction of Radio Frequency and Pulse Parameters in Radar Warning Receivers, Proceedings of International Conference on Emerging Research in Computing, Information , Communication an Applications (ERCICA 2013), Aug. 2013, ISBN 978-9-3510-7102-0, available at http://searchdl.org/public/book_series/elsevierst/1/97.pdf.
Guassianwaves.com—Signal Processing Simplified, Interleavers and deinterleavers, Oct. 25, 2010, http://www.gaussianwaves.com/2010/10/interleavers-and-deinterleavers-2/.
J.D. Parker, Deinterleaver Technology for Future Electronic Support Measures (ESM) Systems, Naval Surface Warfare Center, Dec. 1992, available at http://www.dtic.mil/dtic/tr/fulltext/u2/a265005.pdf.
SysBrain, User's Manual—Reference of the Geometric Bounding Toolbox (GBT) Version 7.3, http://www.sysbrain.com/gbt/gbt/gbt7man.pdf.
K. Fischer et al., Computational Geometry Algorithms Library (CGAL), Reference Manual, Bounding Volumes Reference, http://doc.cgal.org/latest/Bounding_volumes/group__PkgBoundingVolumes.html.
U.S. Appl. No. 15/073,626, filed Mar. 17, 2016.
European Office Action for Patent Application Serial No. 17 181 675.4-1217 dated Dec. 18, 2018; pp. 1-8.

* cited by examiner

SYSTEMS AND METHODS FOR ADDING FUNCTIONAL GRID ELEMENTS TO STOCHASTIC SPARSE TREE GRIDS FOR SPATIAL FILTERING

BACKGROUND

The field of the disclosure relates generally to spatial filtering of signal data received by wide-area surveillance sensors, and, more specifically, to systems and methods for adding functional grid elements to stochastic sparse tree grids for spatial filtering.

In known spatial filtering systems and methods, improved pre-processing front-end architectures generate signal data vectors having new characteristics and require more extensive processing systems and methods. Improvements in known spatial filtering systems and methods including denoising and blind source separation generate signal parameter vectors containing new characteristics and additional new information types. In order to efficiently generate useful deinterleaving information of signal parameter vectors during post-processing, such known spatial filtering systems and methods require substantially more complex processor architectures. Even with improved post-processing architectures, such known spatial filtering systems and methods suffer from diminished deinterleaving performance with new types of signal parameter vector data and non-standard data relative to standard signal parameter vectors.

At least some known spatial filtering and signal parameter vector deinterleaving systems and methods are challenging to implement in a single platform architecture which can only produce angle of arrival (AOA) spatial information, rather than a more exact spatial location. Further, at least some known spatial filtering and signal parameter vector deinterleaving systems and methods are unable, absent highly sophisticated, complex, and expensive post-processing computing requirements, to combine non-standard signal parameters having widely varying accuracies and employ moving emitter platform spatial signal parameters as part of signal parameter vector deinterleaving. Finally, when stochastic histogram methods are used to spread out spatial data in a grid with very small cells for the purpose of generating accurate results, in at least some known spatial filtering systems and methods, use of a standard post-processing architecture is unacceptably inefficient.

BRIEF DESCRIPTION

In one aspect, a method of spatially filtering signal parameter vector data generated by at least one surveillance platform is provided. The at least one surveillance platform includes a sensor configured to receive a plurality of signals from a signal emitter. The method includes receiving, at a computing device, a first signal parameter vector at a first time and a second signal parameter vector at a second time occurring after the first time, the first signal parameter vector including a first signal data block and the second signal parameter vector including a second signal data block, where the first and the second signal parameter vectors are derived from the plurality of signals, and where the first and the second signal data blocks contain spatially-defined information for the signal emitter. The method also includes transmitting, to an array data structure stored in a memory of the computing device and having a plurality of elements including a first element and a second element, the first signal data block to the first element and the second signal data block to the second element, where the array data structure is representative of a physical spatial domain from which the plurality of signals are received by the sensor. The method further includes determining, with the computing device, an elliptical error region probability object containing the first and the second signal data blocks and having a center and a pair of axes, where the center is representative of a highest probability location of the signal emitter in the physical spatial domain at the second time, where the pair of axes is representative of a spatial error of the center at the second time, and where the elliptical error region probability object is stored in the memory in association with the array data structure.

In another aspect, a system for spatially filtering signal parameter vector data generated by at least one surveillance platform from a plurality of signals of a signal emitter is provided. The system includes a sensor configured to receive the plurality of signals. The system also includes a pre-processor coupled to the sensor and configured to generate a plurality of signal parameter vectors derived from the plurality of signals and including a first signal parameter vector and a second signal parameter vector, each signal parameter vector of the plurality of signal parameter vectors derived from one signal of the plurality of signals, where the first signal parameter vector includes a first signal data block and the second signal parameter vector includes a second signal data block, and where the first and the second signal data blocks contain spatially-defined information for the signal emitter. The system further includes a computing device coupled to the pre-processor and including a memory. The computing device is programmed to receive, from the pre-processor, the first signal parameter vector at a first time and the second signal parameter vector at a second time. The computing device is also programmed to transmit, to an array data structure stored in the memory and having a plurality of elements including a first element and a second element, the first signal data block to the first element and the second signal data block to the second element, where the array data structure is representative of a physical spatial domain from which the plurality of signals are received by the sensor. The computing device is further programmed to determine an elliptical error region probability object containing the first and the second signal data blocks and having a center and a pair of axes, where the center is representative of a highest probability location of the signal emitter in the physical spatial domain at the second time, where the pair of axes is representative of a spatial error of the center at the second time, and where the elliptical error region probability object is stored in the memory in association with the array data structure.

In yet another aspect, a non-transient computer-readable memory having computer-executable instructions embodied thereon is provided. When executed by a computing device, the computer-executable instructions cause the computing device to receive, over time, a plurality of signal parameter vectors including a first signal parameter vector at a first time and a second signal parameter vector at a second time, each signal parameter vector of the plurality of signal parameter vectors derived from one signal of a plurality of signals transmitted to the computing device from a sensor configured to receive the plurality of signals from a signal emitter, where the first signal parameter vector includes a first signal data block and the second signal parameter vector includes a second signal data block. When executed by the computing device, the computer-executable instructions also cause the computing device to transmit, to an array data structure stored in the memory and having a plurality of elements including a first element and a second element, the first signal data block to the first element and the second signal data block to the second element, where the array data structure is representative of a physical spatial domain from which the plurality of signals are received by the sensor. When executed by the computing device, the computer-executable instructions further cause the computing device to determine an elliptical error region probability object containing the first and the second signal data blocks and having a center and a pair of axes, where the center is representative of a highest probability location of the signal emitter in the physical spatial domain at the second time, where the pair of axes is representative of a spatial error of the center at the second time, and where the elliptical error region probability object is stored in the memory in association with the array data structure.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
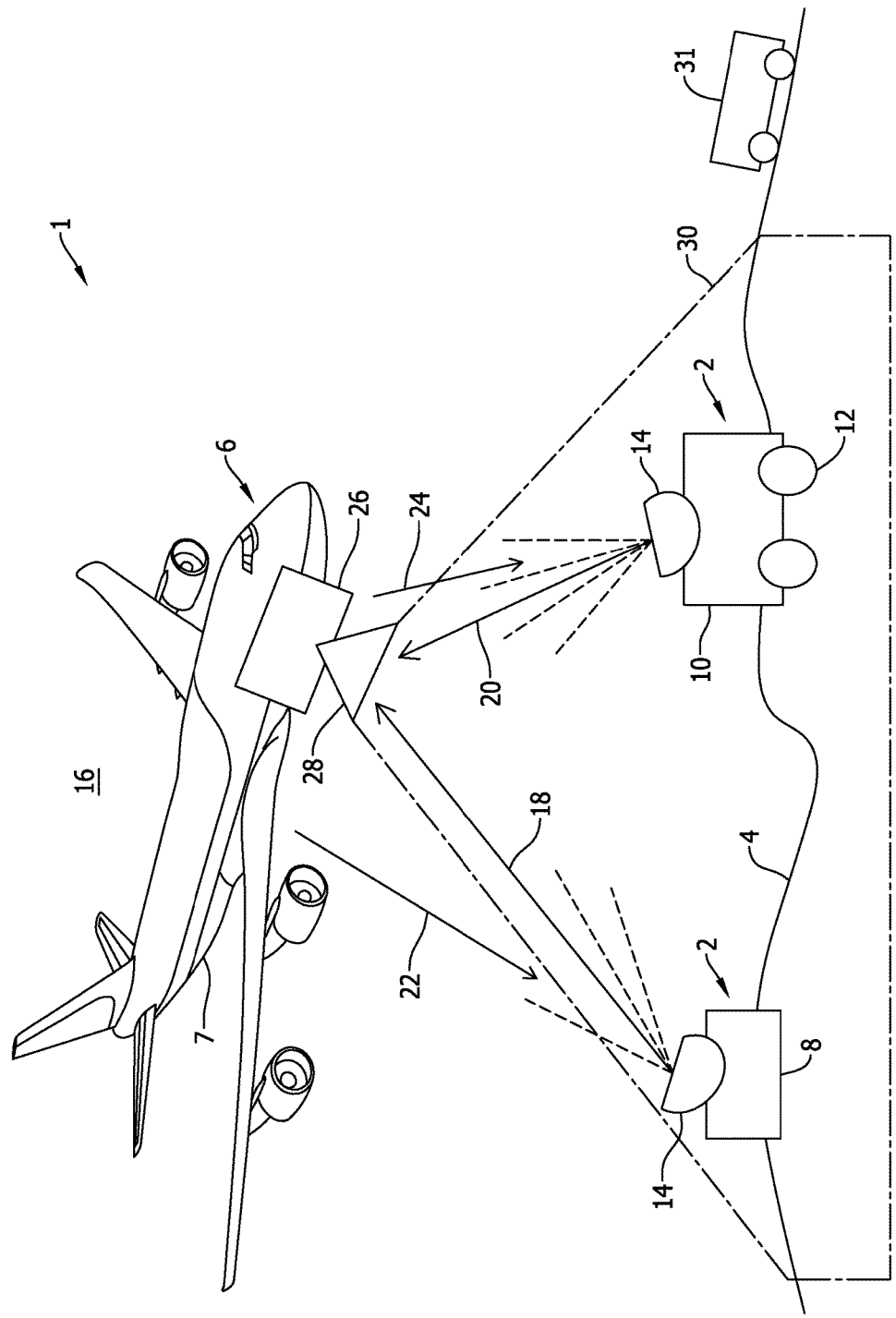
FIG. 1 is a schematic diagram of an exemplary physical environment having a plurality of signal emitters residing on a two-dimensional ground surface surveilled by an aerial wide-area sensor surveillance platform.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, and such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Also, as used herein, the terms "blind source separate", "blind source separated", and "blind source separation" refer to systems and methods employed for separating (e.g., filtering) one or more source signals of interest from a plurality of mixed signals. In applications including, without limitation, an underdetermined case (e.g., fewer observed signals than signal sources), blind source separation facilitates filtering pure signals of interest from an arbitrary set of time-varying signals (e.g., radar pulses from one or more signal emitters) without relying on substantial amounts of known information about the source signals or the signal mixing process.

Further, as used herein, the terms "denoise", "denoised", and "denoising" relate to devices, systems and methods employed to improve the quality of and pre-condition signals of interest received from a noisy environment. Denoising received signals of interest facilitates additional signal processing of the received signals of interest using additional devices, systems, and methods downstream from where signals of interest are initially received by a receiving device such as an antenna.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and methods for adding functional grid elements to stochastic sparse tree grids for spatial filtering described herein enable efficient and high performance deinterleaving of signal parameter vector data generated using improved pre-processing front-end architectures and methods such as denoising and blind source separation. The embodiments described herein also facilitate high performance deinterleaving of signal parameter vectors containing new characteristics such as additional information. The embodiments described herein further enable efficient generation of useful deinterleaving information of signal parameter vectors during post-processing without requiring highly sophisticated, complex, and expensive processor architectures. The systems and methods for adding functional grid elements to stochastic sparse tree grids for spatial filtering described herein also facilitate high performance post-processing of both standard and new signal parameter vector data using a single platform employing a standard processor. The embodiments described herein further provide implementation in a single platform architecture which produces only angle of arrival (AOA) spatial information, rather than a more exact spatial location. The systems and methods for adding functional grid elements to stochastic sparse tree grids for spatial filtering described herein also facilitate combining non-standard signal parameters having widely varying accuracies and employing moving emitter platform spatial signal parameters as part of deinterleaving. The embodiments described herein also enable use of AOA-containing signal parameter vector data to generate accurate results from stochastic histogram methods using standard processors in less time relative to known spatial filtering systems and methods.

FIG. 1 is a schematic diagram of an exemplary physical environment 1 having a plurality of signal emitters 2 residing on a two-dimensional ground surface 4 surveilled by a wide-area sensor-based aerial surveillance platform 6 including, without limitation, an aircraft 7. In an exemplary embodiment, a first ground-based signal emitter 8 is stationary and a second ground-based signal emitter 10 is mobile (e.g., through wheels 12). Both of first ground-based signal emitter 8 and second ground-based signal emitter 10 include a transceiver 14 configured to transmit an electromagnetic signal including, without limitation, a radar signal pulse, into a three-dimensional space including, without limitation, a sky 16. Transceiver 14 is also configured to detect aerial surveillance platform 6 through a reflection of at least one of a first signal 18 and a second signal 20 from aerial surveillance platform 6. Characteristics of aerial surveillance platform 6 detectable by first ground-based signal emitter 8 and second ground-based signal emitter 10 include, without limitation, spatial (e.g., locational) information of aerial surveillance platform 6 in sky 16 discerned from a first reflected signal 22 and a second reflected signal 24, respectively, received by transceiver 14. Spatial information includes, without limitation, a distance (e.g., range) of aerial surveillance platform 6 from transceiver 14, an azimuth from transceiver 14, an elevation relative to transceiver 14, and a velocity of aerial surveillance platform 6.

Also, in an exemplary embodiment, aerial surveillance platform 6 includes a signal processing platform 26 including a receiving antenna 28. Antenna 28 is configured to receive at least one of first signal 18 and second signal 20 from transceiver 14. Antenna 28 is also configured to transmit at least one of first signal 18 and second signal 20 to signal processing platform 26. Antenna 28 and signal processing platform 26 include analog and digital electronic circuit components (not shown) configured to at least one of detect, process, quantify, store, and display various characteristics of first signal 18 and second signal 20. Characteristics of first signal 18 and second signal 20 include, without limitation, a frequency, a time of arrival, a time of departure, a pulse width, a pulse amplitude, a pulse repetition interval, and an AOA. Signal processing platform 26 also includes an analog-to-digital converter configured to generate at least one signal parameter vector containing at least one of the aforementioned characteristics of first signal 18 and second signal 20 as digital data to be processed using a computer-based method on electronic hardware running software executed from a non-transient computer-readable storage media.

In operation, in an exemplary embodiment, signal processing platform 26 provides spatial and identification information about each signal emitter 2 of the plurality of signal emitters 2 located on ground surface 4 in a surveillable area 30 of antenna 28 on aerial surveillance platform 6. Signal data processing methods implemented by signal processing platform 26 including, without limitation, computer-based methods, generate further data in substantially real-time, facilitating substantially real-time determinations of characteristics of each signal emitter 2 of the plurality of signal emitters 2. Characteristics of signal emitters 2 determined by signal data processing methods implemented by signal processing platform 26 include, without limitation, an authorization of a particular signal emitter 2 to operate in the surveillable area 30, whether a particular signal emitter 2 is moving or stationary, and a level of threat (e.g., identification, friend or foe—IFF) that a particular signal emitter 2 poses to at least one of aerial surveillance platform 6, other signal emitters 2 in the surveillable area 30, and any other persons and property (not shown) in at least one of surveillable area 30 and sky 16.

Also, in operation in an exemplary embodiment, characteristics of signal emitters 2 determined by signal data processing methods implemented by signal processing platform 26 also cause a variety of substantially real-time physical actions in physical devices and systems in at least one of electrical communication and data communication with signal processing platform 26. For example, characteristics of signal emitters 2 determined by signal data processing methods implemented by signal processing platform 26 are displayed on at least one of a human machine interface (HMI) and a display, including, without limitation, as a map having a grid representative of a two-dimensional physical spatial domain including the surveillable area 30, where locations and identities of at least one of first ground-based signal emitter 8 and second ground-based signal emitter 10 are plotted substantially in real-time at their respective grid coordinates. Also, for example, characteristics of signal emitters 2 determined by signal data processing methods implemented by signal processing platform 26 are transmitted in substantially real-time as data to actuator controllers in aerial surveillance platform 6 (e.g., rudders and flaps of aircraft 7) to facilitate evasive maneuvers thereof (e.g., by an autopilot function of aircraft 7, including where aircraft 7 is a drone) to avoid an area of operation of a particular signal emitter 2 determined to be a threat.

As a further example, characteristics of signal emitters 2 determined by signal data processing methods implemented by signal processing platform 26 are transmitted in substantially real-time as data as a warning signal to a particular signal emitter 2 operating in the surveillable area 30 without authorization. In addition to the warning signal, characteristics of signal emitters 2 determined by signal data processing methods implemented by signal processing platform 26 are transmitted in substantially real-time as data as an alert signal to an associated mobile device 31 operating in the vicinity of a particular unauthorized and/or threatening signal emitter 2. For example, alert signal is transmitted to at least one of a police and a military unit, including at least one of a robotic and autonomous unit (e.g., drone) having actuator controllers enabled to receive the data and actuate directed movement toward the particular unauthorized and/or threatening signal emitter 2 (e.g., to neutralize the particular unauthorized and/or threatening signal emitter 2). Also, for example, characteristics of signal emitters 2 determined by signal data processing methods implemented by signal processing platform 26 are transmitted in substantially real-time as data as a control signal to at least one of an electronic support measure (ESM) and an electronic warfare (EW) system positioned at least one of proximate antenna 28 and distal aerial surveillance platform 6 to direct, for example, a jamming signal (not shown) at a particular signal emitter 2 operating in the surveillable area 30 without authorization.

Figure 2:
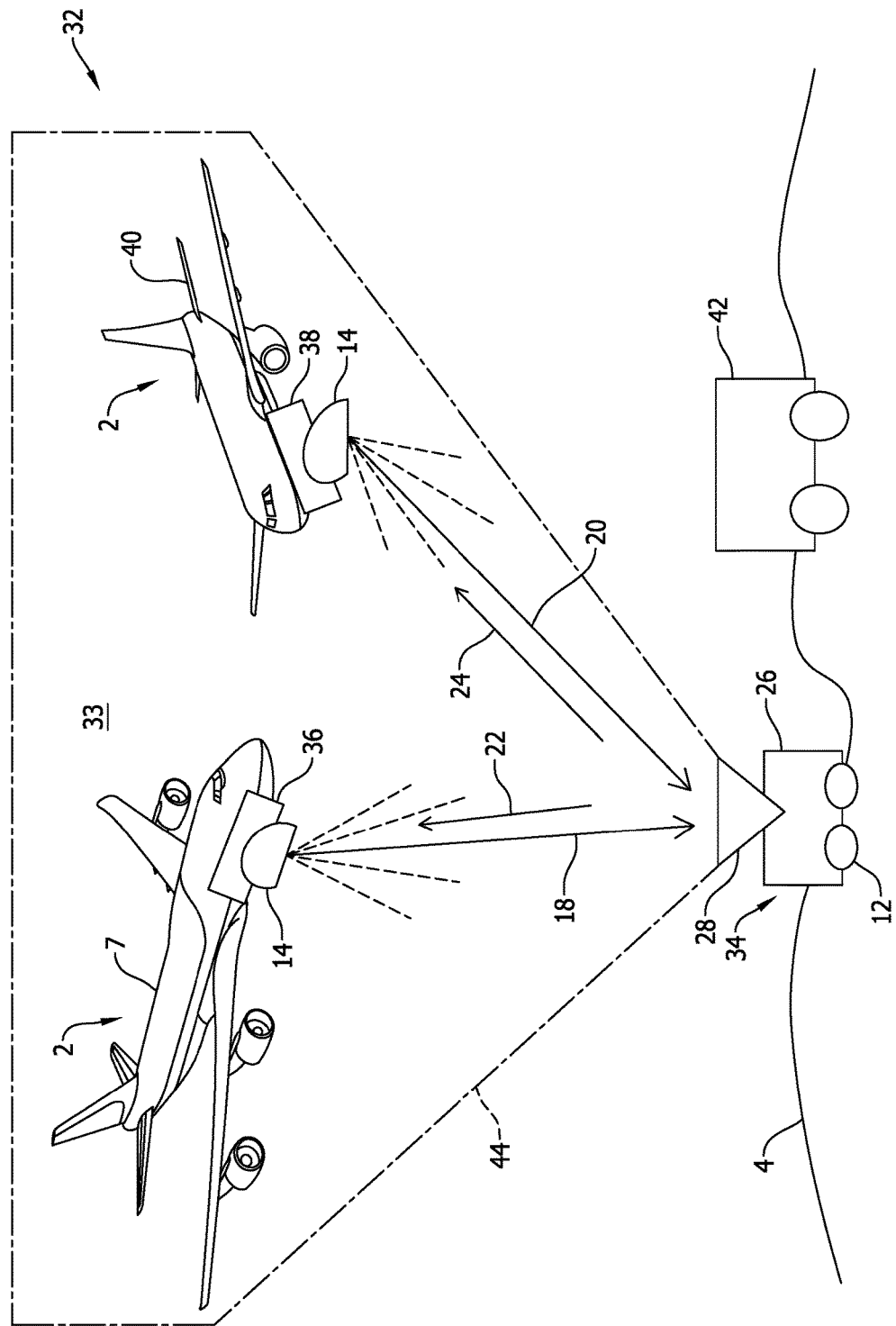
FIG. 2 is a schematic diagram of an alternative physical environment having a plurality of signal emitters residing in a three-dimensional sky region surveilled by a ground-based wide-area sensor surveillance platform.

FIG. 2 is a schematic diagram of an alternative physical environment 32 having a plurality of signal emitters 2 residing in a three-dimensional airspace 33 surveilled by a ground-based wide-area sensor surveillance platform 34 including, without limitation, a mobile surveillance platform (e.g., having wheels 12). In an alternative embodiment, a first aerial signal emitter 36 is coupled to aircraft 7 and a second aerial signal emitter 38 is embodied in a drone 40. Both of first aerial signal emitter 36 and second aerial signal emitter 38 include transceiver 14 configured to transmit a signal to at least one of airspace 33 and ground surface 4. Transceiver 14 is also configured to detect ground-based surveillance platform 34, an associated ground-based device 42, as well as other aerial objects (not shown) through a reflection of at least one of first signal 18 and second signal 20, as shown and described above with reference to FIG. 1. Characteristics of ground-based surveillance platform 34 detectable by first aerial signal emitter 36 and second aerial signal emitter 38 include, without limitation, spatial information of ground-based surveillance platform 34 on ground surface 4 discerned from a first reflected signal 22 and a second reflected signal 24, respectively, received by transceiver 14. Spatial information includes, without limitation, a distance (e.g., range) of ground-based surveillance platform 34 from transceiver 14, an azimuth from transceiver 14, an elevation relative to transceiver 14, and a velocity of ground-based surveillance platform 34 (e.g., where ground-based surveillance platform 34 is mobile).

Also, in an alternative embodiment, ground-based surveillance platform 34 includes signal processing platform 26 including antenna 28 configured to receive at least one of first signal 18 and second signal 20 from transceiver 14. Antenna 28 is also configured to transmit at least one of first signal 18 and second signal 20 to signal processing platform 26. Antenna 28 and signal processing platform 26 include analog and digital electronic circuit components (not shown) configured to at least one of detect, process, quantify, store, and display various characteristics of first signal 18 and second signal 20. Characteristics of first signal 18 and second signal 20 include, without limitation, frequency, time of arrival, time of departure, pulse width, pulse amplitude, pulse repetition interval, and AOA. Signal processing platform 26 also includes an analog-to-digital converter configured to generate at least one signal parameter vector containing at least one of the aforementioned characteristics of first signal 18 and second signal 20 as digital data to be processed using a computer-based method on electronic hardware running software executed from a non-transient computer-readable storage media.

In operation, in an alternative embodiment, signal processing platform 26 provides spatial and identification information about each signal emitter 2 of the plurality of signal emitters 2 located in airspace 33 in a surveillable space 44 (e.g., sky 16) of antenna 28 on ground-based surveillance platform 34. In other embodiments, not shown, surveillable space 44 is a surveillable volume of water (e.g. under the surface of a body of water). In still other embodiments, not shown, surveillable space 44 is a surveillable region of outer space. Signal data processing methods implemented by signal processing platform 26 including, without limitation, computer-based methods, generate further data in substantially real-time, facilitating substantially real-time determinations of characteristics of each signal emitter 2 of the plurality of signal emitters 2. Characteristics of signal emitters 2 determined by signal data processing methods implemented by signal processing platform 26 include, without limitation, an authorization of a particular signal emitter 2 to operate in the surveillable space 44, whether a particular signal emitter 2 is traveling at a supersonic velocity of not, and a level of threat that a particular signal emitter 2 poses to at least one of ground-based surveillance platform 34, other signal emitters 2 in the surveillable space 44 of airspace 33, and any other persons and property (not shown) in at least one of the surveillable space 44 and the entire airspace 33.

Also, in operation in an alternative embodiment, characteristics of signal emitters 2 determined by signal data processing methods implemented by signal processing platform 26 also cause a variety of substantially real-time physical actions in physical devices and systems in at least one of electrical communication and data communication with signal processing platform 26. For example, characteristics of signal emitters 2 determined by signal data processing methods implemented by signal processing platform 26 are displayed on at least one of an HMI and a display, including, without limitation, as a map having a grid representative of a three-dimensional physical spatial domain including the surveillable space 44, where locations and identities of at least one of first aerial signal emitter 36 and second aerial signal emitter 38 are plotted substantially in real-time at their respective grid coordinates. Also, for example, characteristics of signal emitters 2 determined by signal data processing methods implemented by signal processing platform 26 are transmitted in substantially real-time as data to actuator controllers in mobile embodiments of at least one of ground-based surveillance platform 34 and associated ground-based device 42 (e.g., steering and drive train of a vehicle) to facilitate evasive maneuvers thereof (e.g., by at least one of manual, autonomous, and robotic functionality) to avoid an area of operation on ground surface 4 of a particular signal emitter 2 determined to be a threat.

As a further example, characteristics of signal emitters 2 determined by signal data processing methods implemented by signal processing platform 26 are transmitted in substantially real-time as data as a warning signal to a particular signal emitter 2 operating in the surveillable space 44 without authorization. In addition to the warning signal, characteristics of signal emitters 2 determined by signal data processing methods implemented by signal processing platform 26 are transmitted in substantially real-time as data as an alert signal to associated ground-based device 42 operating in the vicinity of a particular unauthorized and/or threatening signal emitter 2. For example, alert signal is transmitted to at least one of a police and military unit, including at least one of a robotic and autonomous unit (e.g., drone) having actuator controllers enabled to receive the data and actuate directed movement toward the particular unauthorized and/or threatening signal emitter 2 (e.g., to neutralize the particular unauthorized and/or threatening signal emitter 2). Also, for example, characteristics of signal emitters 2 determined by signal data processing methods implemented by signal processing platform 26 are transmitted in substantially real-time as data as a control signal to at least one of an ESM and an EW system positioned at least one of proximate antenna 28 and distal ground-based surveillance platform 34 to direct, for example, a jamming signal (not shown) at a particular signal emitter 2 operating in the surveillable space 44 without authorization.

Figure 3:
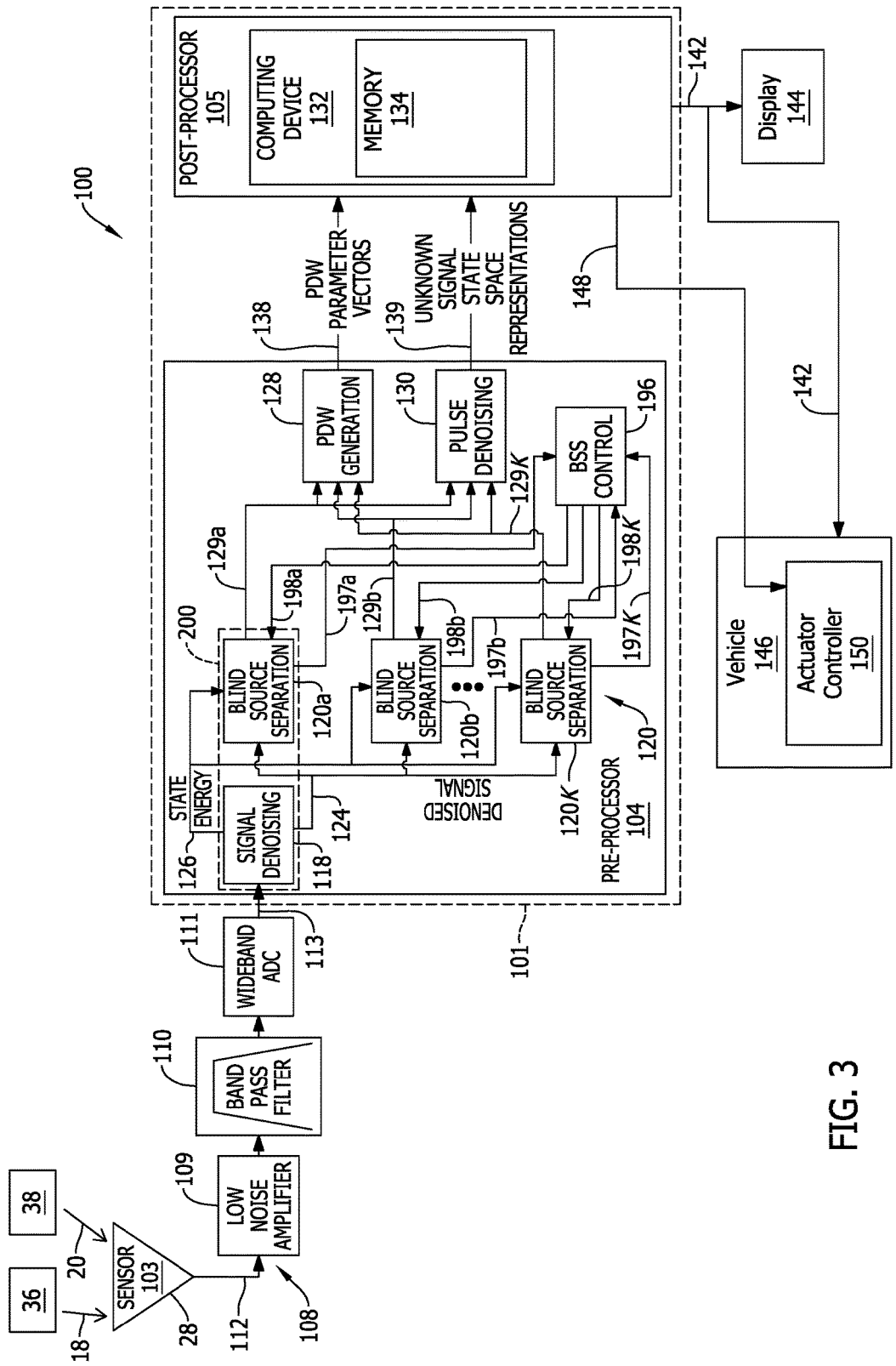
FIG. 3 is a schematic diagram of an exemplary signal processing system that may be used with the surveillance platforms shown in FIGS. 1 and 2.

FIG. 3 is a schematic diagram of an exemplary signal processing system 100 that may be used with the surveillance platforms (e.g., aerial surveillance platform 6 and/or ground-based surveillance platform 34) shown in FIGS. 1 and 2, respectively. In an exemplary implementation, signal processing system 100 generates pulse descriptor word (PDW) vectors 138 using blind source separation (BSS) of received signals derived from, for example, and without limitation, radar signals. More generally, in other implementations, signal processing system 100 enables generating signal parameter vectors (e.g., a signal parameter vector 138) other than PDW vectors in a substantially similar manner as described herein. Also known as blind signal separation, BSS is used to separate (e.g., filter) one or more source signals of interest from a plurality of mixed signals. In applications including, without limitation, an underdetermined case (e.g., fewer observed signals than signal sources), BSS facilitates separating and identifying pure signals of interest from an arbitrary set of time-varying signals (e.g., radar pulses from one or more signal emitters) without relying on substantial amounts of known information about the signal emitters, signals of interest, or the signal mixing process.

In the exemplary embodiment, signal processing system 100 includes a signal data processor 101 communicatively coupled to antenna 28. Antenna 28, in the exemplary embodiment, is a wide-area sensor 103. Signal data processor 101 includes a pre-processor 104 and a post-processor 105. Sensor 103 is configured to receive signals from, for example, and without limitation, first 36 and second 38 aerial signal emitters. Although two signal emitters 36 and 38 are shown in FIG. 3, those of skill in the art will appreciate that sensor 103 may receive signals from any number of signal emitters 36 and 38.

Sensor 103 is communicatively coupled to pre-processor 104 through a pre-conditioner 108. In the exemplary embodiment, pre-conditioner 108 includes a low noise amplifier 109, a band pass filter 110, and a wideband analog-to-digital converter (ADC) 111. In operation, pre-conditioner 108 is configured to convert a sensor output signal 112 received from sensor 103 into an incoming signal 113 transmitted to pre-processor 104. Each incoming signal 113 is derived from a time-varying signal received at sensor 103. Time-varying signal may include a mix of signals received from signal emitters 36 and 38. For example, time-varying signals may include first signal 18 and second signal 20.

In the exemplary embodiment, pre-processor 104 includes one or more signal denoising modules 118, and a plurality of blind source separation (BSS) modules 120. Each BSS module 120 is coupled to a single signal denoising module 118, and represents one BSS channel 200. A total number of BSS channels 200 in signal processing system 100 is expressed as K. Signal denoising module 118 transmits a denoised signal 124 and a state energy signal 126 to each respective BSS module 120 (e.g., 120a, 120b, . . . , 120K) of the plurality of BSS modules 120. State energy signal 126 represents a quantity (e.g., an analog voltage level) that is proportional to an amplitude of incoming signal 113 at particular sampled time points (e.g., states).

In operation, incoming signal 113 is transmitted from pre-conditioner 108 to signal denoising module 118 where incoming signal 113 undergoes signal denoising and is subsequently transmitted as denoised signal 124 to the each BSS module 120. For example, first signal 18 is initially received at sensor 103 as a pulse having signal characteristics including, without limitation, a frequency and a bandwidth. In this example, a single pulse of first signal 18, after processing by pre-conditioner 108, is then received at signal denoising module 118 as a mixed signal (e.g., the incoming signal 113 represents a signal pulse of the first signal 18 and has various characteristics including, without limitation, noise and information other than the desired information of interest). Signal denoising module 118 denoises the mixed incoming signal 113 prior to transmitting denoised signal 124 having a frequency and a bandwidth (or a regular pattern of frequencies and bandwidths) to the BSS modules 120. Methods implemented by signal processing system 100 are performed in substantially real-time by the devices and systems described above.

Further, in the exemplary embodiment, pre-processor 104 includes one or more PDW generation modules 128 coupled to each BSS module 120, and a pulse denoising module 130 coupled to each BSS module 120. PDW generation module 128 generates PDW parameter vector 138 based on blind source separated signals 129 received from each BSS module 120. Each PDW parameter vector 138 contains data representative of characteristics of interest of one of signals 18 and 20 derived from a singular pulse of blind source separated signal 129 (e.g., frequency, bandwidth, time of arrival, time of departure, pulse width, pulse amplitude, pulse repetition interval, and/or AOA). Pulse denoising module 130 also generates an unknown signal state space representation signal 139 based on blind source separated signals 129. Unknown signal state space representation signal 139 contains data representative of additional (e.g., non-PDW-type) characteristics of interest of one of signals 18 and 20 from which usable spatial information about one of signal emitters 36 and 38 is discernable. PDW parameter vectors 138 and unknown signal state space representation signals 139 are transmitted to post-processor 105. Signal denoising module 118, PDW generation module 128, and pulse denoising module 130 include suitable signal filtering, signal amplification, signal modulation, signal separation, signal conditioning, and/or ADC circuitry implemented using analog and/or digital electronic circuit components. Also, in the exemplary embodiment, each BSS module 120 transmits a respective blind source separated signal 129 (e.g., 129a, 129b, . . . , 129K) to PDW generation module 128 and to pulse denoising module 130.

Post-processor 105 includes a computing device 132 that includes a memory 134. As described above, PDW generation module 128 receives blind source separated signals 129 from each respective BSS module 120. PDW generation module 128 then utilizes the blind source separated signals 129 to generate a PDW parameter vector 138, which is subsequently transmitted to post-processor 105. PDW parameter vector 138 is received by computing device 132 and stored as non-transient computer-readable data in memory 134 including, without limitation, as at least one buffered data set. Pulse denoising module 130 is also configured to receive blind source separated signals 129 from each respective BSS module 120. Pulse denoising module 130 is further configured to utilize the blind source separated signals 129 to generate the unknown signal state space representation signal 139, which is subsequently transmitted to post-processor 105. Unknown signal state space representation signal 139 is received by computing device 132 and stored as non-transient computer-readable data in memory 134 including, without limitation, as at least one buffered data set. In the exemplary embodiment, computing device 132 fetches buffered data sets from memory 134 for processing using a computer-based method employing an operating system running software executed from instruction set data also stored in a non-transient memory 134 (e.g., from one or more non-transient computer-readable storage media).

Computing device 132 implements a computer-based method (e.g., from software instructions stored in memory 134) to carry out operations based on data contained in at least one of PDW parameter vector 138 and unknown signal state space representation signal 139. Such operations include, without limitation, detecting, processing, quantifying, storing, and displaying (e.g., in human readable data form) various characteristics of at least one signal (e.g., signals 18 and 20) represented as data in at least one of PDW parameter vector 138 and unknown signal state space representation signal 139. For example, PDW parameter vector 138 generated by PDW generation module 128 contains a plurality of PDW vector data blocks structured in a vector form, where each PDW vector data block contains one parameter of first signal 18. Parameters (e.g., representative of at least one characteristic of first signal 18) include, without limitation, frequency, bandwidth, time of arrival, time of departure, pulse width, pulse amplitude, pulse repetition interval, and/or AOA. Computing device 132 reads PDW parameter vector 138 and carries out at least one of the aforementioned operations on at least one PDW vector data block of the plurality of PDW vector data blocks. Also, in the exemplary embodiment, computing device 132 reads and separates (e.g., deinterleaves) PDW parameter vector 138 into its constituent PDW vector data blocks, and stores fewer PDW vector data blocks in memory 134 than the total number of PDW vector data blocks contained in PDW parameter vector 138. Deinterleaving of PDW parameter vector 138 enables determining characteristics of interest of signals 18 and/or 20 by computing device 132 to, for example, and without limitation, accurately determine and track spatial information for signal emitters 36 and/or 38. In other implementations, computing device 132 reads and separates all PDW vector data blocks from one another and stores all data contained therein in memory 134. Computing device 132 performs the aforementioned operations substantially simultaneously (e.g., in real-time) upon receipt of signals 18 and 20 by sensor 103.

Resultant data from operations performed by computing device 132 are stored in memory 134. Further, in the exemplary embodiment, computing device 132 causes post-processor 105 to transmit a data output signal 142 to an HMI to facilitate at least one of an interaction, a modification, a visualization, at least one further operation, and a viewable recording of information about signals 18 and 20 by a user of signal processing system 100. HMI is, for example, a display 144 which receives data output signal 142 from post-processor 105. In one example, characteristics (e.g., location characteristics such as grid coordinates in a physical spatial domain, e.g., two-dimensional ground surface 4) representing a physical location of signal emitters 36 and 38, as determined by signal processing system 100, are displayed on display 144, and are updated in substantially in real time. Data output signal 142 is also transmitted from post-processor 105 to at least one device and/or system (e.g., a vehicle 146) associated with signal processing system 100. Further, computing device 132 enables post-processor 105 to transmit, in substantially real-time, an actuator control signal 148 to an actuator controller 150 included within vehicle 146 to facilitate controlling vehicle 146. For example, vehicle 146 may be a remotely and/or autonomously operated land vehicle and/or an unmanned aerial vehicle (UAV, e.g., drone 40).

In one mode of operation, at least one of frequency and bandwidth information contained in respective PDW parameter vectors 138 is displayed on display 144 along with locations of respective signal emitters 36 and 38 to facilitate accurate tracking of locations and association with particular signal emitters 36 and 38. In cases where at least one signal emitter 36 and 38 is mobile, display 144 is automatically updated in substantially real-time to show the location information of at least one respective mobile signal emitter 36 and 38. Further, computing device 132 also determines at least one of a velocity, an acceleration, a trajectory, and a track (e.g., including present and prior locations) of the at least one respective mobile signal emitter 36 and 38. In another mode of operation, characteristics determined by signal data processor 101 also trigger a variety of substantially real time physical actions in physical devices and systems in communication with signal processing system 100. For example, characteristics of signal emitters 36 and 38, including frequency and bandwidth determined by signal processing system 100, are transmitted in substantially real-time as data to actuator controller 150 in vehicle 146 (e.g., to control rudders and flaps of a UAV). If signal emitters 36 and 38 are unauthorized (e.g., hostile, previously undetected, etc.) signal emitters determined to be a threat, actuator controller 150 maneuvers vehicle 146 to avoid an area of operation of signal emitters 36 and 38 or engages signal emitters 36 and 38. As a further example, characteristics of signal emitters 36 and 38 determined by signal data processing methods described herein are transmitted in substantially real-time in a control signal to at least one of an electronic support measure (ESM) device and an electronic warfare (EW) system associated with signal processing system 100 to direct, for example, a jamming signal at signal emitters 36 and 38 operating in the surveillable environment of sensor 103 without authorization.

In operation, each BSS module 120 of the plurality of BSS modules 120 in signal processing system 100 implements filtering methods with dynamic updating to enable generating high quality PDWs containing at least one of frequency, center frequency, bandwidth, pulse time, and pulse width information. Such improved accuracy and resolution of PDWs to track, for example, frequency and bandwidth of signals of interest facilitates identifying, determining, and/or analyzing signal emitters 36 and 38 from which associated signals are emitted. For example, information including, without limitation, information derived from PDWs from signal emitters 36 and 38 is displayed on display 144 after being transmitted thereto by post-processor 105 as data output signal 142, as described above. This improved information enables signal processing system 100 to distinguish first aerial signal emitter 36 from second aerial signal emitter 38. Also, for example, different signal emitters 36 and 38 in a surveilled environment of sensor 103 are plotted at respective locations (e.g., grid coordinates) on display 144 (e.g., as a map).

Also, in operation, the plurality of BSS modules 120 separate a plurality of denoised signals 124. Each BSS module 120 contains a plurality of tunable filters (not shown), where each filter operates based on filter parameters including, without limitation, a center frequency and a bandwidth. Further, in the exemplary embodiment, pre-processor 104 includes a BSS control module 196, which facilitates controlling each respective BSS module 120 of the plurality of BSS modules 120. BSS control module 196 receives respective BSS data signals 197 (e.g., 197a, 197b, . . . , 197K) containing BSS-related information including, without limitation, frequency, bandwidth, and state, from each BSS module 120 of the plurality of BSS modules 120. Based on the BSS-related information contained in BSS data signals 197, BSS control module 196 also generates and transmits respective BSS control signals 198 (e.g., 198a, 198b, . . . , 198K) back to each respective BSS module 120 to control, for example and without limitation, a timing of receipt of denoised signal 124 and transmission of respective blind source separated signals 129 to at least one of PDW generation module 128 and pulse denoising module 130. Information contained in BSS data signals 197 and BSS control signals 198 is used by BSS control module 196 to facilitate implementation of a feedback control loop.

Figure 4:
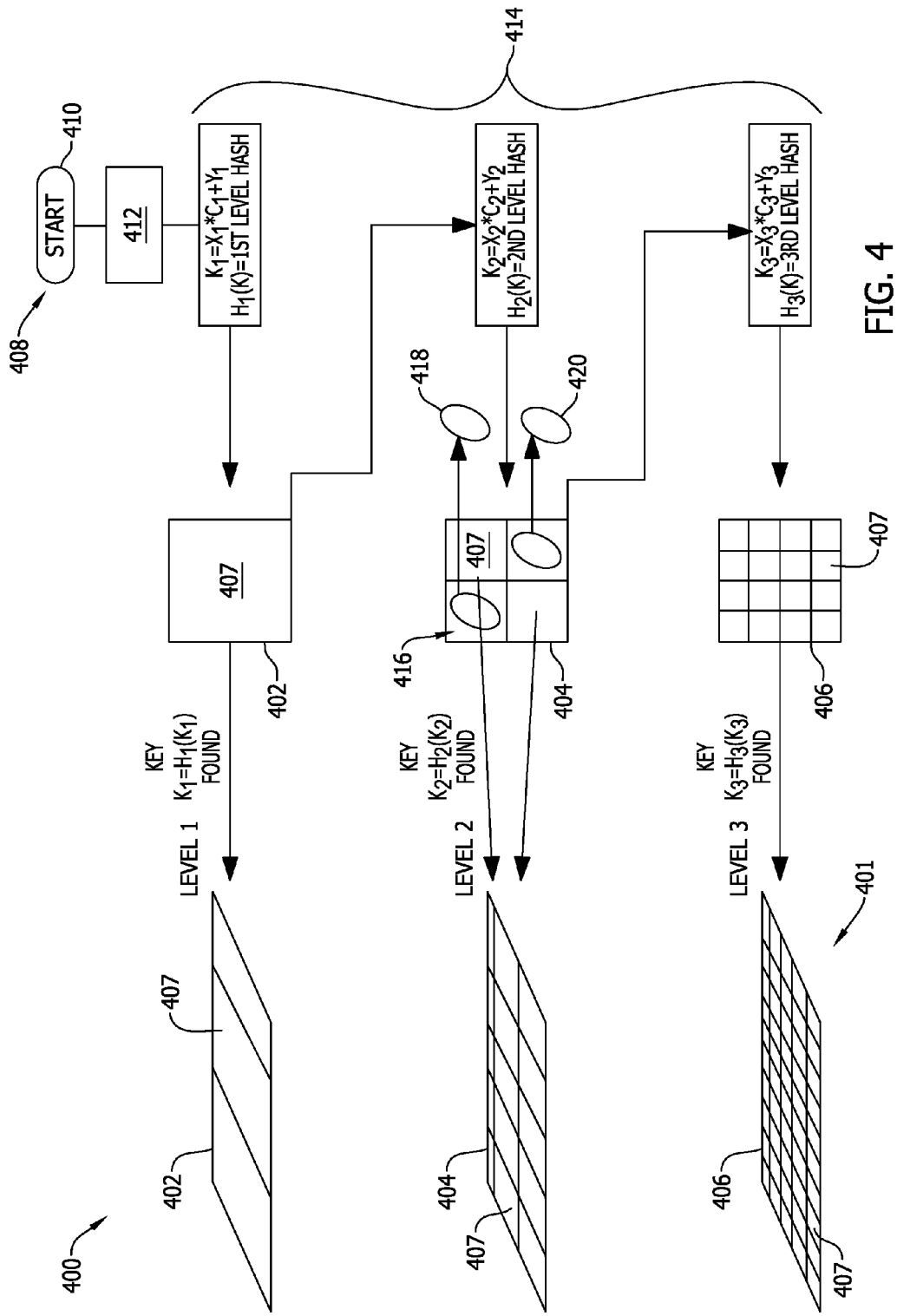
FIG. 4 is a schematic diagram of an exemplary process for deinterleaving signal parameter vector data that may be used with the signal processing system shown in FIG. 3.

FIG. 4 is a schematic diagram of an exemplary process 400 for deinterleaving signal parameter vector 138 data that may be used with signal processing system 100 shown in FIG. 3. In an exemplary embodiment, at least one array data structure 401 is stored at at least one address in memory 134 (not shown). Array data structure 401 includes a plurality of arrays including a sparse (e.g., coarse) array (e.g., grid denoted "Level 1") 402, a medium array 404 ("Level 2"), and a fine array 406 ("Level 3"). Each array of the plurality of arrays includes a plurality of elements (e.g., grid coordinates) 407 which are subaddressed from the address of array data structure 401 in memory 134. Sparse array 402 contains a lesser number of elements 407 than medium array 404, and fine array 406 contains a greater number of elements 407 than medium array 404. Further, elements 407 of sparse array 402, medium array 404, and fine array 406 represent successively finer representations of substantially equal sized subregions of a physical spatial domain (e.g., at least one of surveillable area 30 and surveillable space 44). At any given time, a collection of elements 407 represents, at any point in time, at least one of an area and a volumetric space of surveillable area 30 and surveillable space 44, respectively. In the case of a mobile signal data processing platform 26 (not shown) having signal processing system 100, the collection of elements 407 represents, over successive points (e.g., frames) in time, a varying, rather than substantially constant, area and volumetric space of surveillable area 30 and surveillable space 44, respectively.

Also, in an exemplary embodiment, a shadow hash key routine 408 is stored as software instructions in memory 134 and is executed by computing device 132 (not shown) in a computer-based method. Shadow hash key routine 408 is run on computing device 132 upon a user-initiated start state 410 including, without limitation, at least one of powering on and waking up signal processing system 100. Start state 410 proceeds to a first subroutine 412 during which computing device 132 continually checks whether or not at least one of signal parameter vector 138 data and unknown signal state space representation signal 139 data is received by post-processor 105 from pre-processor 104. If at least one of signal parameter vector 138 data and unknown signal state space representation signal 139 data is not received by post-processor 105, shadow hash key routine 408 loops back and performs first subroutine 412 again.

If, during first subroutine 412, computing device 132 determines that at least one of signal parameter vector 138 data and unknown signal state space representation signal 139 data is received by post-processor 105 from pre-processor 104, shadow hash key routine 408 proceeds to a second subroutine 414. During second subroutine 414, computing device 132, in conjunction with memory 134, executes software instructions to at least one of read (e.g., get), insert (e.g., write), and delete spatially-defined data obtained using sensor 103. Also, during second subroutine 414 executes a first shadow hash key function defined as:

$$H_1(k) = \text{Level 1 hash}$$

where $H_1(k)$ is a hash function for mapping keys to elements 407 in sparse array 402, and k is the subaddress of at least one spatially-defined data record in sparse array 402 (e.g., element 407 in sparse array 402 at which the at least one spatially-defined data record is stored in memory 134). Key k, therefore, corresponds to the subregion of the surveilled physical spatial domain at a given point in time. In the case of sparse array 402 representative of a two-dimensional surveillable area 30, key k is determined as follows:

$$k_1 = x_1 * c_1 + y_1$$

where $k_1$ is the key, $c_1$ is a constant (e.g., determined by computing device 132), and $x_1$ and $y_1$ define the index into sparse array 402 having the subaddress of the respective element 407 (e.g., corresponding to a latitude and a longitude in the physical spatial domain).

Further, in an exemplary embodiment, shadow hash key routine 408 is executed in conjunction with storing at least one of signal parameter vector 138 data and unknown signal state space representation signal 139 data in memory 134 at a respective element 407 in sparse array 402 corresponding to a subregion in the physical spatial domain. During second subroutine 414, computing device 132 checks whether or not a key $k_1$ is found by $H_1(k)$ hash function. If key $k_1$ is not found, computing device 132 executes a second shadow hash key function, $H_2(k) = \text{Level 2 hash}$, substantially similar to the first shadow hash key function, but performed on medium array 404 rather than sparse array 402. If key $k_1$ is found, computing device 132 determines whether or not the spatially-defined data of interest is present in sparse array 402. If the spatially-defined data of interest is not stored in sparse array 402, computing device 132 then determines whether a pointer to an address in medium array 404 is present and, if so, second subroutine 414 is directed there. In the event the spatially-defined data is not stored in medium array 404, but rather medium array 404 contains a pointer to an address in fine array 406, second subroutine 414 is similarly directed there. Second subroutine 414 continues in this manner until computing device 132 finds the desired data value or values of interest, or it is determined that the value or values are not stored in memory 134.

As further shown and described below with reference to FIGS. 5-6, with each successive signal received, vectorized, and deinterleaved by signal processing system 100 over time, a plurality of elements 407 of array data structure 401 will have stored in them a plurality of signal data blocks with associated spatially-defined data values. The associated spatially-defined data values are derived from, and represent spatial characteristics of at least one signal emitter 2 physical spatial environment (e.g., at least one surveillable area 30 and surveillable space 44). Computing device 132 also executes shadow hash key routine 408 to generate and store in memory 134 at least one elliptical error region probability object 416 representative of spatial information having widely varying error magnitudes and stored in a plurality of elements 407 in more than one of sparse array 402, medium array 404, and fine array 406. In an exemplary embodiment, process 400 includes a first elliptical error region probability object 418 and a second elliptical error region probability object 420. Shadow hash key routine 408 also facilitates combining spatial data values including, without limitation, non-sparse spatial objects, of varying sparseness amongst at least two of sparse array 402, medium array 404, and fine array 406 into at least one elliptical error region probability object 416 that is operable on by computing device 132 within a stochastic sparse tree grid including array data structure 401, for example as described in U.S. Pat. No. 8,805,858, titled "Methods and systems for spatial filtering using a stochastic sparse tree grid" and incorporated by reference herein in its entirety. Therefore, elliptical error region probability object 416 enables representation of spatial data initially acquired and further derived from at least one sensor 103 in a single and memory- and computationally-efficient representation. Further, in an exemplary embodiment, shadow hash key routine 408 thus provides an efficient lookup method using shadow hash keys, and it operates within array data structure 401 using individual elements 407 and elliptical error region probability object 416 to store, organize, select, and analyze spatial signal data of interest and to read, write, and delete that data in an operationally-, computationally-, and memory-efficient manner.

In the context of U.S. Pat. No. 8,805,858, supra, process 400 and shadow hash key routine 408 facilitate use of signal denoising module 118 and the at least one blind source separation module 120 (referred to above as an "EW frontend" of signal processing system 100, not shown). Also, in other embodiments, not shown, process 400 and shadow hash key routine 408 facilitate sharing of spatial information between cooperating sensor 103-containing surveillance platforms (e.g., including at least one of one or more aerial surveillance platforms 6 and/or one or more ground-based surveillance platforms 34) configured to share their information, and employing widely varying types of sensors 103 types, sensors 103 requiring fusion of results, and/or any other sensor 103 front-end that produces sensor data with widely differing error magnitudes for the sensor-derived spatial information produced. The addition of process 400 and shadow hash key routine 408 to the methods and systems for spatial filtering using a stochastic sparse tree grid described in U.S. Pat. No. 8,805,858, supra, enables shadow hash keys to look up ellipsoidal regions in addition to typical grid elements 407 for the purpose of getting, inserting and deleting spatially-defined sensor information in stochastic tree grids.

In operation, in an exemplary embodiment, ellipsoidal regions including, without limitation, elliptical error region probability objects 416 are meant in a general sense and include intersections of ellipsoidal regions as well as angular regions defined by intersections of half plane regions, for example. A half plane can be considered a degenerate ellipse for algorithmic purposes and, therefore, ellipsoidal regions and their intersections refer to generalized ellipsoidal regions and their intersections. Widely different error magnitudes in the spatial information from at least one sensor 103 means these different regions are of both very large size and very small size, such that processing them together with standard grids (e.g., fine array 406, which is only efficiently processed with computing device 132 in cases of sparse spatial data within small areas or regions of surveilled physical spatial environment) requires new efficient methodologies. Process 400 and shadow hash key routine 408 enables this joint processing to be done efficiently and accurately based on a gridding methodology that can include objects such as ellipsoids and half spaces of up to M dimensions, where M is the number of vector input parameters present in signal parameter vector 138 (for example), or of two dimensions in the case of typical electro-optic/infrared-type sensors 103, or of three dimensions in the case of certain Laser/Light Detection and Ranging (LADAR/LIDAR)-based surveillance platform systems.

Sensor fusion involving communicatively cooperating multiple types of sensors 103, in an exemplary embodiment, includes a plurality of different possible processing dimensions. In general, however, the vector size of the input for the tree grid used in process 400 is denoted below as M, assuming that the vector of inputs are considered as random variables and have associated standard deviations. When the tree grid of process 400 and shadow hash key routine 408 is used in this manner with implied or measured errors in an entire set of parameters, the regions can become so large as to be computationally- and memory-inefficient if implemented using sparse techniques described in U.S. Pat. No. 8,805,858, supra. Process 400 thus facilitates an improved method to store and lookup efficiently both sparse grid elements 407 and non-sparse elliptical error region probability objects 416, all within a stochastic tree grid as disclosed previously in U.S. Pat. No. 8,805,858, supra. Basic objects being added to the stochastic tree grid in process 400 are defined as follows:

An ellipsoid $E(\mu,Q)$ in $R^n$ with center mu ($\mu$) and shape matrix Q is the set:

$$E(\mu,Q)=\{x \in R^n | (x-\mu)^T Q^{-1}(x-\mu) \leq 1\}$$

where a half space (e.g., a half plane in two dimensions) can be treated as an unbounded ellipsoid (e.g., an ellipsoid with the shape matrix where all but one of its eigenvalues are infinite).

Also, in operation, computing device 132 uses the above described representation of ellipsoid $E(\mu,Q)$ in a projective form for efficiency in computation and memory usage. Thus, $(M+2)(M+1)$ unique coefficients for a general ellipsoid of dimension M is defined by:

$$E(\mu,Q)=\{x \in R^n | (x,1)^T Q'^{-1}(x,1) \leq 0\}$$

where Q' is an enlarged shape matrix. This ellipsoid also has an associated probability density function (PDF) defined as:

$$PDF_{u,Q}(x_1 \ldots x_M) =$$

$$PDF_{u,Q}(x) = \frac{1}{\sqrt{(2\pi)^M |Q|}} \exp\left(-\frac{1}{2}(x-\mu)^T Q^{-1}(x-\mu)\right),$$

for all $x \in E$

Further, in operation, an exemplary use case of process 400 employs at least one elliptical error region probability object 416 with shadow hash key routine 408 on spatially-defined data derived from at least one sensor 103. By operating at a 3-sigma (3σ) level for example, the support of a trimmed normal (e.g., Gaussian) PDF of an error directly corresponds to an ellipsoid. Hence, the ellipsoidal shape directly maps to the PDF that has this shape as its support. The intersection of two half planes represents a wedge that corresponds to a two dimensional angular area out to infinity, which, in an exemplary embodiment, further represents an angle-only sensor 103 provided AOA spatial information. A distance along a center line parameterizes a one dimensional (1D) Gaussian PDF with an increasing width. By combining this with an intersection of a circle of a given radius (a special type of ellipse), an angular region is thus determined defined out to a maximum distance for at least one sensor 103 a known maximum sensitivity and/or surveilling physical spatial environments of interest of a predefined maximum size. The intersection of four half planes in three-dimensional (3D) space with each pair orthogonal to the other pair allows a rectangular wedge representing an angle in space out to infinity and distance along center line is parameterized to a two-dimensional (2D) Gaussian PDF with axes given by the orthogonal pairs.

EW systems (e.g., embodied in signal processing system 100 employed for radar pulse sensing, for example) are receive-only systems that have front-end receivers that produce, for example, and without limitation, pulse descriptor words (PDWs) for each radar pulse they detect. They are unlike radar systems in that they do not naturally produce range and they must handle unknown signals rather than detect reflected versions of their transmitted signals. Also, since there is more than one type of EW signal that must be detected, the detection is more than one dimensional. Process 400 and shadow hash key routine 408 including, without limitation, utilized in combination with methods and systems for stochastic sparse tree grid for spatial filtering as described in U.S. Pat. No. 8,805,858, supra, enable spatial filtering of such EW signals with higher probability of detection of weak signals within spatially defined noise and interfering signals, a higher probability of correct classification through improved statistical methods applied to spatial information. Process 400 and shadow hash key routine 408 thus facilitate longer range detection and classification, detection and classification with a smaller antenna 28 and/or aperture, and detection and classification using lower transmit power.

Furthermore, in operation, process 400 and shadow hash key routine 408 facilitates the aforementioned benefits in the context of a single EW platform which can only produce angle of arrival spatial information, rather than a more exact spatial location. During surveillance of a very large 2D physical area or 3D physical space where at least one signal emitter 2 of interest might be located, computational and memory usage efficiency suffers greatly with sparsely classified and organized AOA determinations stored in array data structure 401 in grids with very small elements 407 (e.g., as fine or finer as fine array 406). This is especially true when employing the systems and methods described in U.S. Pat. No. 8,805,858, supra, with sparse AOA data and where the sparse stochastic histogram tree grid uses a (multidimensional) sparse stochastic histogram. This is due, in part, to the fact that most bins of fine array 406 have no data when observing ground or airborne signal emitters 2. Similarly, using a single grid to store all signal information to form a spatial filter is inefficient since most spatial information is very irregular. For example, some levels of array data structure 401 are dense and some regions thereof are very sparse, causing a hash table much inefficiency since there it operates under an assumption that the number of keys within a single hash is relatively constant across the entire array, thereby increasing the linear search time to unacceptably high levels as more data values and/or objects are added to array data structure 401.

Moreover, in operation, when the only spatial information comes from AOA of signal emitter 2 pulses from the very large surveilled environment, the associated error is large and therefore the number of occupied histograms will be large when spreading using stochastic techniques. Process 400 and shadow has key routine thus improves computation and memory usage efficiency to record occupancy of the plurality of histograms by reducing the number of grid elements 407 needed overall in array data structure 401 by creating sparsity through multiple levels (e.g., at least two of sparse array 402, medium array 404, and fine array 406) of the tree grid. Adding shadow hash key routine 408 to this multi-level and multi-resolution grid approach improves performance of spatial filtering further by enabling computing device 132 to perform get, insert and delete operations not only on individual array levels of array data structure 401, but on at least one elliptical error region probability object 416 as well.

Moreover, in operation, process 400 with shadow hash key routine 408 uses stochastic histograms in place of ordinary histograms having discrete bins into which data either falls within or does not, resulting in a distortion of the appearance of the histogram depending on the bin size and whether the data lands in the center of the bin or near an edge thereof. Mathematically, the ordinary histogram approaches a binned PDF of the data as more and more data is added, provided the bin size is small enough. However, the aforementioned distortion causes the histogram to approach the PDF much more slowly than the stochastic histogram approach and, hence, requires more data (which is often scarce in practice) and more memory to get good results. The stochastic histogram approach employed by process 400 and shadow hash key routine 408 uses the measured or assumed variance of each parameter to spread the histogram when each data point is added. Thus, instead of only incrementing the bin where a data point falls, nearby bins are added to as well depending on the probability spread. In the case of at least one elliptical error region probability object 416, the spreading is assumed when the PDF is set for each data input and, therefore, this spreading is implied directly. Further, when computing the final value of a grid or location, the values of intersections of at least one elliptical error region probability object 416 values that intersect elements 407 of that grid must be added together.

Also, in operation, a multidimensional sparse stochastic histogram is used in the situation where most bins have no data (e.g., the input data is sparse within the tree grid). It uses the mechanism of the sparse tree grid previously described in its implementation to reduce the memory requirements (e.g., only non-zero bins and elliptical error region probability objects 416 take storage). Again, as with the stochastic histogram, even though the Gaussian distribution has an infinitely long tail, in a practical implementation, a threshold such as plus or minus 3 standard deviations can be used. This limits the number of operations to update a sparse stochastic histogram to a constant times the number of input signals. Also, in operation of process 400, incorporating a priori information is also possible using the newly available elliptical error region probability objects 416. For example, there is often fixed spatial information coming from maps or physical features within space that can influence the spatial filter differently at different locations and this can be captured in array data structure 401 through both grid elements 407 and ellipsoidal. Therefore, a weighting function on the ellipsoid can be computed that is proportional to the probability this a priori information is present given assumed land feature information.

Further, in operation, slight modifications on the aforementioned systems and methods to add to stochastic histograms can proceed as before. For example, circular sparse stochastic histograms are used to insert circular measurements (such as used for angle input) and can be associated with an intersection of two half planes (e.g., in two dimensions) and its attendant PDF. It is done by inserting modulo 2πor modulo 360°. Also, sparse aging using time weighting proceeds on elliptical error region probability objects 416 as with grid elements 407 in the same manner. In particular, it allows the new elliptical error region probability objects 416 to age out and disappear. Referring back to systems and methods described in U.S. Pat. No. 8,805,858, supra, standard histograms age objects by deleting ones which make up the histogram and which are older than a certain predetermined age (e.g., objects with a time value whose difference with the present time is greater than a predetermined amount). This allows unclassified objects to "age out" of the histogram. In particular, noise signals would not ordinarily be tracked and so would remain untracked until ultimately disappearing. This is necessary since otherwise the noise floor on a spatial filter histogram would continue to rise until even strongly accumulating bins of repetitive signals would be swamped by adjacent noise bins. In contrast, in operation of process 400, by using time weighting, a stochastic histogram keeps linked lists of objects belonging to each "bin" (e.g., grid element 407) in time order and de-accumulates these repetitive signals gradually by using a series of time weights based on a set of time interval ages. Thus, the weighting could be exponentially decreasing if desired, or even uniform in other cases, depending on particular application requirements of signal processing system 100. Therefore, with process 400 and shadow hash key routine 408, we simply add that the list of objects now include elliptical error region probability objects 416 that age out and disappear over time.

Figure 5:
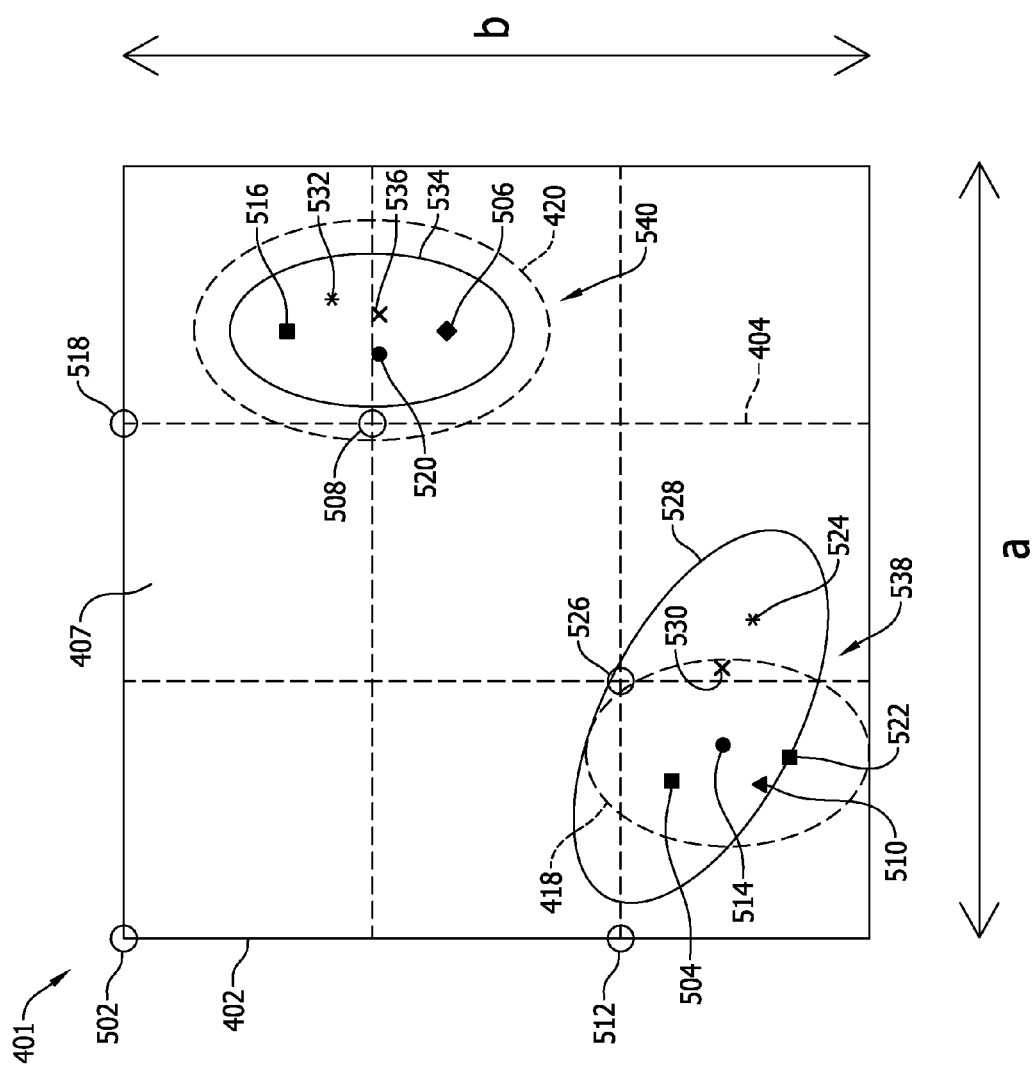
FIG. 5 is a schematic diagram of a plurality of elliptical error region probability objects stored in an array data structure as determined using the process shown in FIG. 4.

FIG. 5 is a schematic diagram of first elliptical error region probability object 418 and second elliptical error region probability object 420 determined using process 400 and stored in array data structure 401, as shown in FIG. 4. In an exemplary embodiment, sparse array 402 is embodied in a two dimensional (2D) a-by-b array with a=1 and b=1, and having one element 407 representative of a subregion of surveillable area 30. Overlayed on sparse array 402 is medium array 404 embodied in a 2D a-by-b array with a=3 and b=3, and having nine elements 407 representative of nine subregions of surveillable area 30. In other embodiments, not shown, a does not equal b in medium array 404. In still other embodiments, not shown, at least one of sparse array 402 and medium array 404 is embodied in a three-dimensional (e.g., cubic) array. Sparse array 402 and medium array 404 share an origin 502 defined by an address in memory 134. A first signal data block 504 of a first type (e.g., a first AOA, denoted by a solid square) received by sensor 103 and deinterleaved by signal processing system 100 at a first time point from a first signal emitter 2 (not shown) maps to sparse array 402. At a second point in time after the first point in time, a second signal data block 506 of a second type (e.g., a second AOA, denoted by a solid diamond in FIG. 5) received from a second signal emitter 2 maps to a first subaddress 508 in medium array 404. Next, at a third point in time after the second point in time, a third signal data block 510 of a third type (e.g., a first location, denoted by a solid triangle in FIG. 5) received from first signal emitter 2 maps to a second subaddress 512.

With sparse array 402 and second subaddress 512 together containing two spatially-defined signal data blocks from first signal emitter 2 after the third point in time, key is found by shadow hash key routine 408, and computing device 132 determines first elliptical error region probability object 418 of specific resolved addresses (e.g., locations in the physical spatial domain) of first signal data block 504 with respect to third signal data block 510. Determination of first elliptical error region probability object 418 by computing device 132 includes determining a first center 514 (denoted as a solid dot in FIG. 5) and a first pair of axes (not shown) of a first ellipsoidal region defining first elliptical error region probability object 418 in array data structure 401. First center 514 is representative of a highest probability location at the third point in time of first signal emitter 2 in surveillable area 30, and first pair of axes is representative of the spatial error (e.g., standard deviation) of first center 514 at the third point in time. At least one of first elliptical error region probability object 418, first center 514, first pair of axes, and spatial error of first center 514 are at least one of stored in memory 134 and displayed as human-readable data on display 144.

At a fourth point in time after the third point in time, a fourth signal data block 516 of the first type (denoted by a solid square in FIG. 5) maps to a third subaddress 518 of medium array 404. With medium array 404 containing two spatially-defined signal data blocks from second signal emitter 2 after the fourth point in time, key is found by shadow hash key routine 408, and computing device 132 determines second elliptical error region probability object 420 of specific resolved addresses (e.g., locations in the physical spatial domain) of second signal data block 506 with respect to fourth signal data block 516. Determination of second elliptical error region probability object 420 by computing device 132 includes determining a second center 520 (denoted as a solid dot in FIG. 5) and a second pair of axes (not shown) of a second ellipsoid region defining second elliptical error region probability object 420 in array data structure 401. Second center 520 is representative of a highest probability location of second signal emitter 2 at the fourth point in time in surveillable area 30, and second pair of axes is representative of the spatial error (e.g., standard deviation) of second center 520 at the fourth point in time. At least one of second elliptical error region probability object 420, second center 520, second pair of axes, and spatial error of second center 520 are at least one of stored in memory 134 and displayed as human-readable data on display 144.

At a fifth time point and a sixth time point, a fifth signal data block 522 of the first type (denoted by a solid square in FIG. 5) and a first non-standard data point 524 (e.g., not signal parameter vector derived, but rather derived from non-standard data from which spatially defined information is derivable from unknown signal state space representation signal 139), respectively, are received from first signal emitter 2. First non-standard data point 524 is denoted by an asterisk in FIG. 5. Fifth signal data block 522 maps to second subaddress 512 and first non-standard data point 524 maps to a fourth subaddress 526. With sparse array 402 and medium array 404 together containing three spatially-defined signal data blocks and one non-standard data point from first signal emitter 2 after sixth point in time, key is found by shadow hash key routine 408, and computing device 132 determines a refined (e.g., updated) first elliptical error region probability object 528 of specific resolved addresses (e.g., locations in the physical spatial domain) of first signal data block 504, third signal data block 510, fifth signal data block 522, and first non-standard data point 524 with respect to one another. Determination of refined first elliptical error region probability object 528 by computing device 132 includes determining a refined first center 530 (denoted as an "x" in FIG. 5) and a refined first pair of axes (not shown) of a refined first ellipsoid region defining refined first elliptical error region probability object 528 in array data structure 401. Refined first center 530 is representative of an updated highest probability location of first signal emitter 2 at the sixth point in time in surveillable area 30, and refined first pair of axes is representative of an updated spatial error (e.g., standard deviation) of refined first center 530 at the sixth point in time. At least one of refined first elliptical error region probability object 528, refined first center 530, refined first pair of axes, and updated spatial error of refined first center 530 are at least one of stored in memory 134 and displayed as human-readable data on display 144.

At a seventh time point, a second non-standard data point 532 (denoted by an asterisk in FIG. 5) is received from second signal emitter 2 and maps to third subaddress 518. With medium array 404 together containing two spatially-defined signal data blocks and one non-standard data point from second signal emitter 2 after seventh point in time, key is found by shadow hash key routine 408, and computing devices determines a refined (e.g., updated) second elliptical error region probability object 534 of specific resolved addresses (e.g., locations in the physical spatial domain) of second signal data block 506, fourth signal data block 516, and second non-standard data point 532 with respect to one another. Determination of refined second elliptical error region probability object 534 by computing device 132 includes determining a refined second center 536 (denoted as an "x" in FIG. 5) and a refined second pair of axes (not shown) of a refined second ellipsoid region defining refined second elliptical error region probability object 534 in array data structure 401. Refined second center 536 is representative of an updated highest probability location of second signal emitter 2 at seventh point in time in surveillable area 30, and refined second pair of axes is representative of an updated spatial error (e.g., standard deviation) of refined second center 536 at the seventh point in time. At least one of refined second elliptical error region probability object 534, refined second center 536, refined second pair of axes, and updated spatial error of refined second center 536 are at least one of stored in memory 134 and displayed as human-readable data on display 144.

Also, in an exemplary embodiment, after second non-standard data point 532 is stored in array data structure 401 and seventh time point has elapsed, a first data cluster 538 and a second data cluster 540 reside in sparse array 402 and medium array 404. For first data cluster 538, refinement of first elliptical error region probability object 418 to refined first elliptical error region probability object 528 increased the respective spatial error and increased the area of the respective ellipsoid region. The increase in area of the respective ellipsoid region is indicative of first signal emitter 2 being a mobile signal emitter 2. Computing device 132 is also configured to determine at least one of a velocity, an acceleration, and a direction of movement of a mobile signal emitter 2, and at least one of store this data in memory 134 and display it in human-readable form on display 144. In second data cluster 540, however, the respective spatial error and ellipsoid region area decreased, which is indicative that second signal emitter 2 is not mobile. Computing device 132 is further configured to delete at least one of outlier signal data blocks and outlier non-standard data points from memory 134 using outlier statistical methods performed from software instructions stored on and executed from memory 134. Such outlier statistical methods facilitate efficient use of memory resources and prevent a mischaracterization of a particular signal emitter 2 as mobile when, in fact, it is stationary in the physical spatial domain.

Further, in an exemplary embodiment, when a particular signal emitter 2 has been located in the physical spatial domain with an acceptable error and determined to be stationary, computing device 132 is configured to delete associated data from array data structure 401, thereby freeing space in memory 134. When a particular signal emitter 2 has not yet been located in the physical spatial domain with an acceptable error, signal processing system 100 continues to deinterleave received signals as described above and further refine associated elliptical error region probability objects 416 until such time that an acceptable degree of spatial error is reached and/or a particular signal emitter 2 is determined to be mobile.

Figure 6:
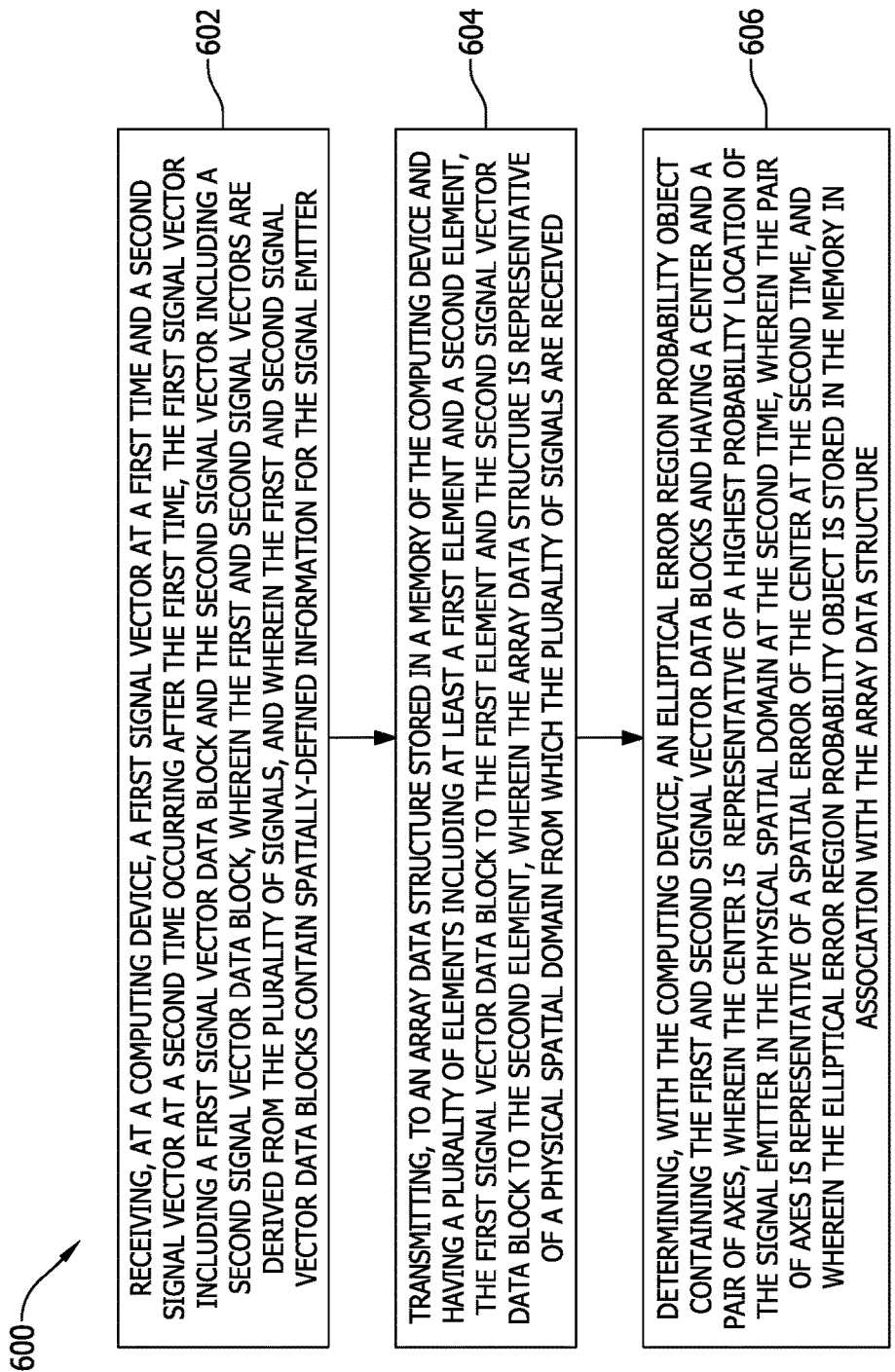
FIG. 6 is a flowchart of an exemplary method of spatially filtering signal parameter vector data that may be used with the signal processing system shown in FIG. 3.

FIG. 6 is a flowchart of an exemplary method 600 of spatially filtering signal parameter vector data that may be used with signal processing system 100 shown in FIG. 3. In an exemplary embodiment, method 600 includes receiving 602, at computing device 132, a first signal parameter vector (e.g., containing first signal data block 504) at a first time and a second signal parameter vector (e.g., containing third signal data block 510) at a second time occurring after the first time. The first and second signal data blocks contain spatially-defined information for signal emitter 2. Method 600 also includes transmitting 604, to array data structure 401 stored in memory 134 and having plurality of elements 407 including at least a first element 407 and a second element 407, first signal data block and second signal data block to first and second elements 407, respectively, of array data structure 401 (e.g., elements 407 of at least one of sparse array 402, medium array 404, and fine array 406). Array data structure 401 is representative of a physical spatial domain (e.g., surveillable area 30) from which the plurality of signals are received by, for example, sensor 103, from signal emitter 2. Method 600 further includes determining 606, with computing device 132, elliptical error region probability object 416 containing first and second signal data blocks and having a center (e.g., first center 514) and a pair of axes. Center is representative of a highest probability location of signal emitter 2 in physical spatial domain at the second time, and pair of axes is representative of a spatial error of center at the second time. Determining also includes storing elliptical error region probability object 416 in memory 134 in association with array data structure 401.

Figure 7:
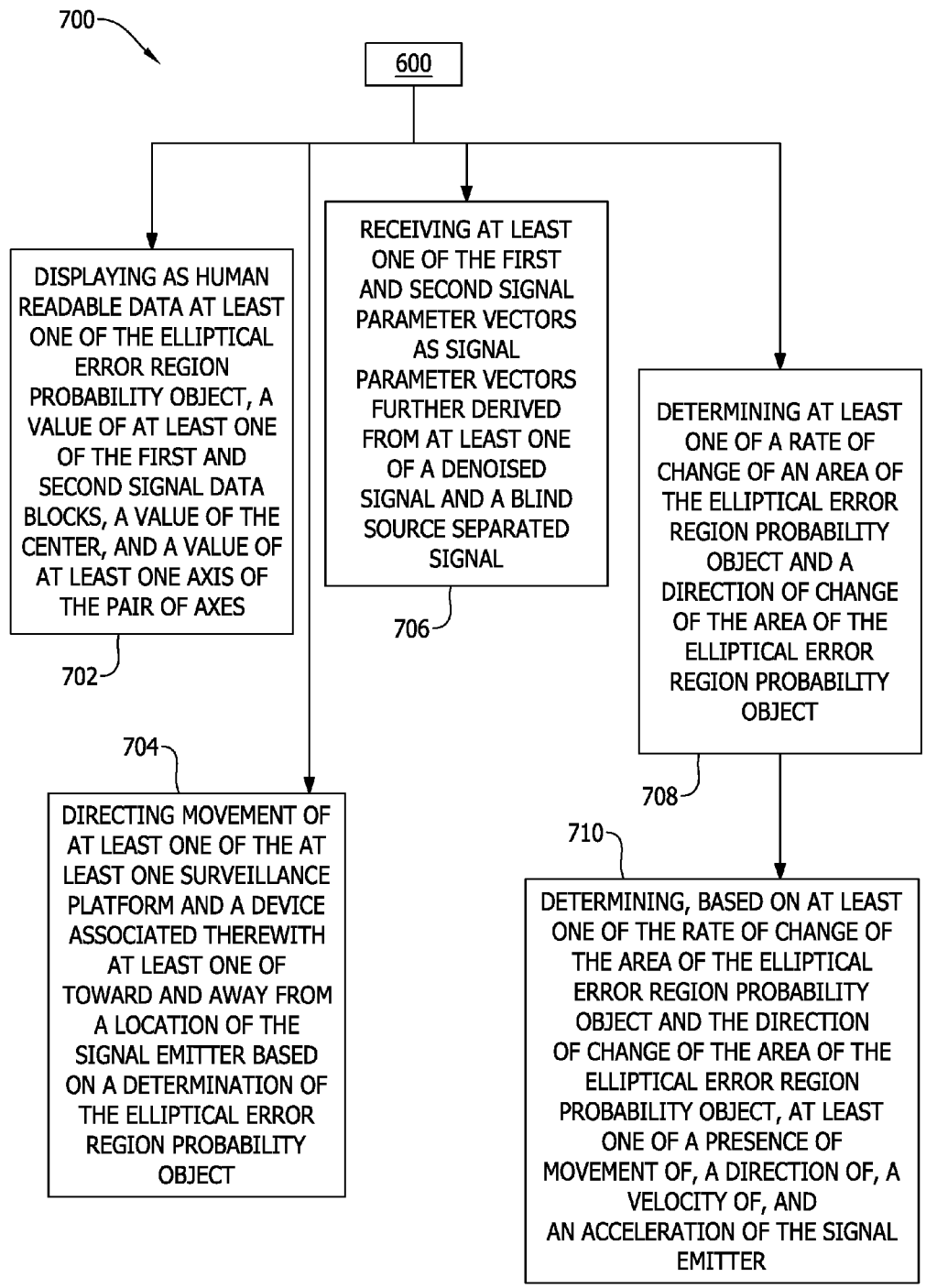
FIG. 7 is a flowchart of an alternative method of spatially filtering signal parameter vector data that may be used with the signal processing system shown in FIG. 3.

FIG. 7 is a flowchart of an alternative method 700 of spatially filtering signal parameter vector data that may be used with signal processing system 100 shown in FIG. 3. In an alternative embodiment, method 700 includes steps of method 600 as shown and described above with reference to FIG. 6. Method 700 also includes displaying 702 data output signal 142 as human-readable data via display 144 coupled to computing device 132, at least one of elliptical probability error region object (e.g., at least one of elliptical error probability region objects 418 and 420), a value of at least one of first 504 and second 506 signal data blocks, a value of center (e.g., at least one of centers 514 and 520), and a value of at least one axis of the pair of axes. Method 700 further includes directing 704 movement of at least one of the at least one surveillance platform (e.g., at least one of surveillance platforms 6 and 34) and device associated therewith (e.g., at least one of devices 31 and 42) at least one of toward and away from a location of signal emitter (e.g., at least one of signal emitters 2, 8, 10, 36, and 38) based on a determination of the elliptical error region probability object.

Also, in an alternative embodiment, in method 700, receiving 602 (as shown and described above with reference to FIG. 6) further includes receiving 706 at least one of the first and second signal parameter vectors 138 as signal parameter vectors 138 further derived from at least one of denoised signal 124 and blind source separated signal 129. Method 700 also includes determining 708, with computing device 132, at least one of a rate of change of an area of elliptical error region probability object and a direction of change of the area of elliptical error region probability object. Method 700 further includes determining 710, with computing device 132 and based on at least one of the rate of change of the area of elliptical error region probability object and the direction of change of the area of elliptical error region probability object, at least one of: a presence of movement of signal emitter, a direction of movement of signal emitter, a velocity of signal emitter, and an acceleration of signal emitter.

Figure 8:
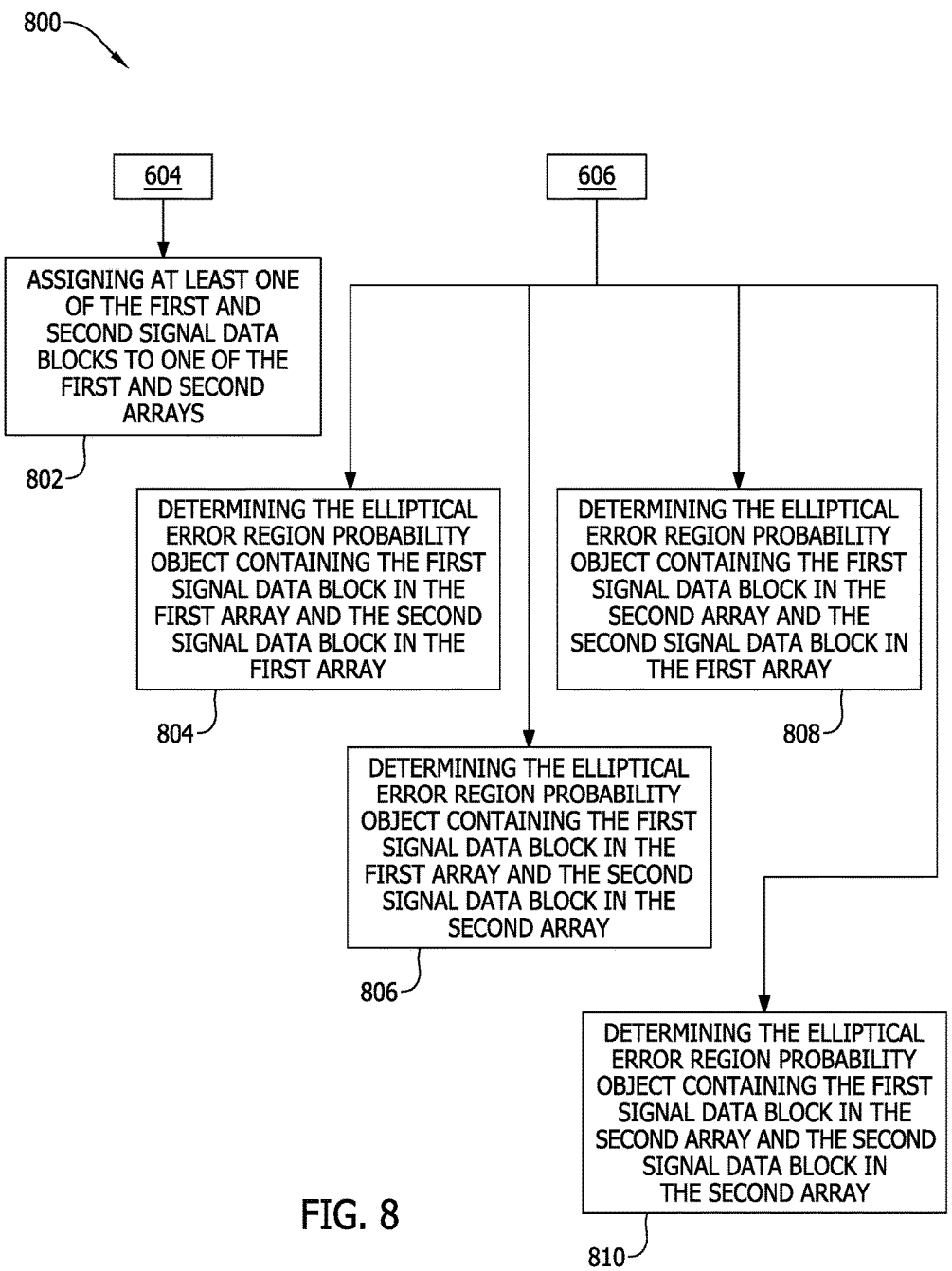
FIG. 8 is a flowchart of an alternative method of spatially filtering signal parameter vector data that may be used with the signal processing system shown in FIG. 3.

FIG. 8 is a flowchart of an alternative method 800 of spatially filtering signal parameter vector data that may be used with signal processing system 100 shown in FIG. 3. In an alternative embodiment, method 800 includes steps of method 600, as shown and described above with reference to FIG. 6. Also, in an alternative embodiment, in method 800, array data structure 401 includes a plurality of arrays (e.g., sparse array 402, medium array 404, and fine array 406). The plurality of arrays includes a first array having a first number of elements 407 and a second array having a second number of elements 407. Further, in an alternative embodiment, in method 700, transmitting 604 (as shown and described above with reference to FIG. 6) further includes assigning 802, with computing device 132, at least one of the first 504 and second 506 signal data blocks to one of the first and second arrays. Furthermore, in an alternative embodiment, in method 800, determining 606 (as shown and described above with reference to FIG. 6) further includes at least one of: determining 804 the elliptical error region probability object (e.g., first 418 and/or second 420 elliptical error region probability object) containing the first signal data block 504 in the first array and the second signal data block 506 in the first array; determining 806 the elliptical error region probability object containing first signal data block 504 in first array and second signal data block 506 in second array; determining 808 the elliptical error region probability object containing first signal data block 504 in second array and second signal data block 506 in first array; and determining 810 the elliptical error region probability object containing first signal data block 504 in second array and second signal data block 506 in second array.

Figure 9:
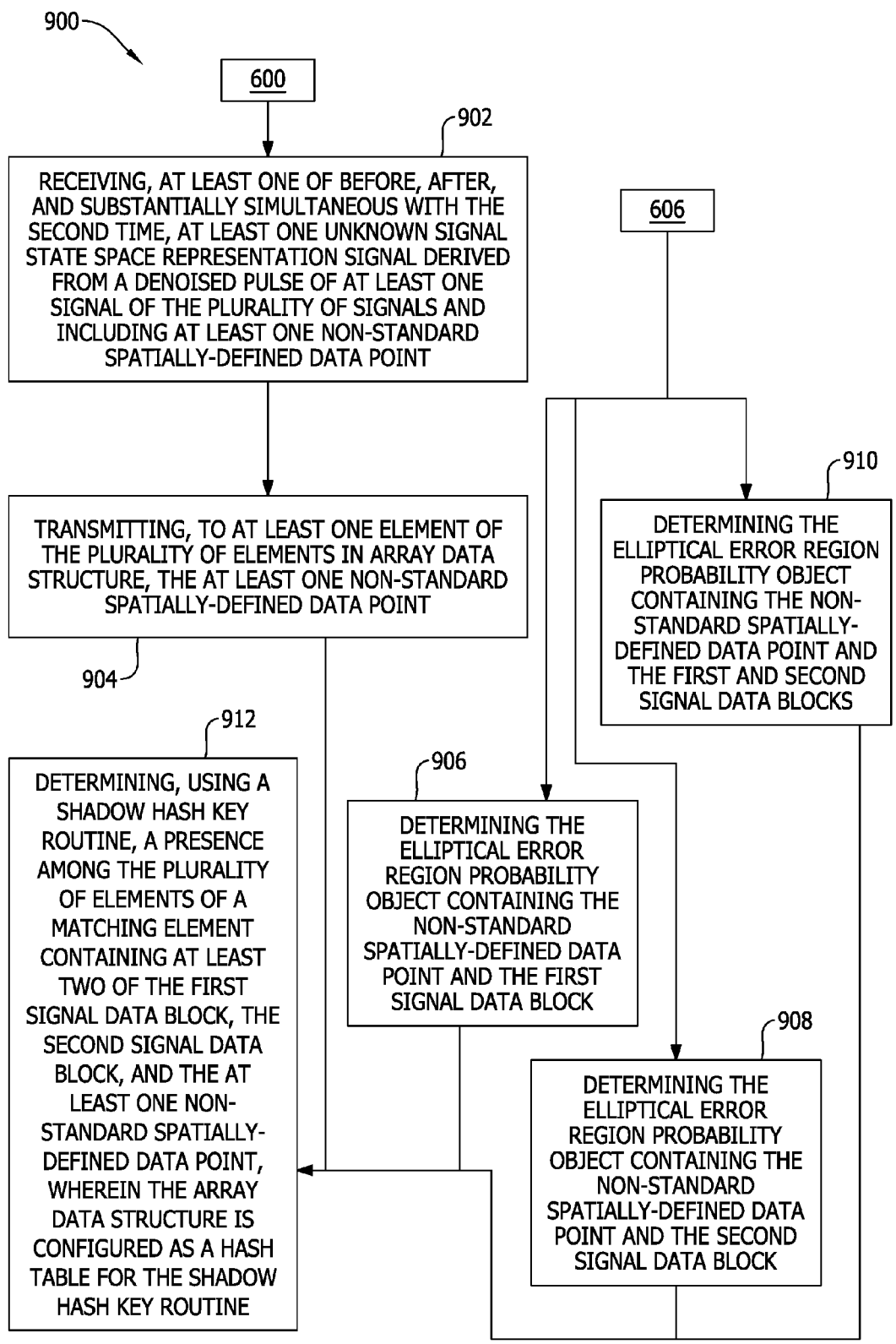
FIG. 9 is a flowchart of an alternative method of spatially filtering signal parameter vector data that may be used with the signal processing system shown in FIG. 3.

FIG. 9 is a flowchart of an alternative method 900 of spatially filtering signal parameter vector data that may be used with signal processing system 100 shown in FIG. 3. In an alternative embodiment, method 900 includes steps of method 600, as shown and described above with reference to FIG. 6. Method 900 also includes receiving 902, at computing device 132 at least one of before, after, and substantially simultaneously with the second time, at least one unknown signal state space representation signal 139 derived from a denoised signal 124 pulse of at least one signal of the plurality of signals 18 and 20 and including at least one non-standard spatially-defined data point (e.g., at least one of non-standard spatially-defined data points 524 and 532). Method 900 further includes transmitting 904, to at least one element 407 of the plurality of elements 407 in array data structure 401, the at least one non-standard spatially-defined data point.

Also, in an alternative embodiment, in method 900, determining 606 (as shown and described above with reference to FIG. 6) further includes at least one of: determining 906 the elliptical error region probability object containing the non-standard spatially-defined data point and first signal data block 504; determining 908 the elliptical error region probability object containing the non-standard spatially-defined data point and second signal data block 506; and determining 910 the elliptical error region probability object containing the non-standard spatially-defined data point and the first 504 and second 506 signal data blocks. Method also includes determining 912, using shadow hash key routine 408 executed by computing device 132, a presence among the plurality of elements 407 of a matching element 407 containing at least two of first signal data block 504, second signal data block 506, and the at least one non-standard spatially-defined data point. Also, in determining 912, array data structure 401 is configured as a hash table for shadow hash key routine 408.

Figure 10:
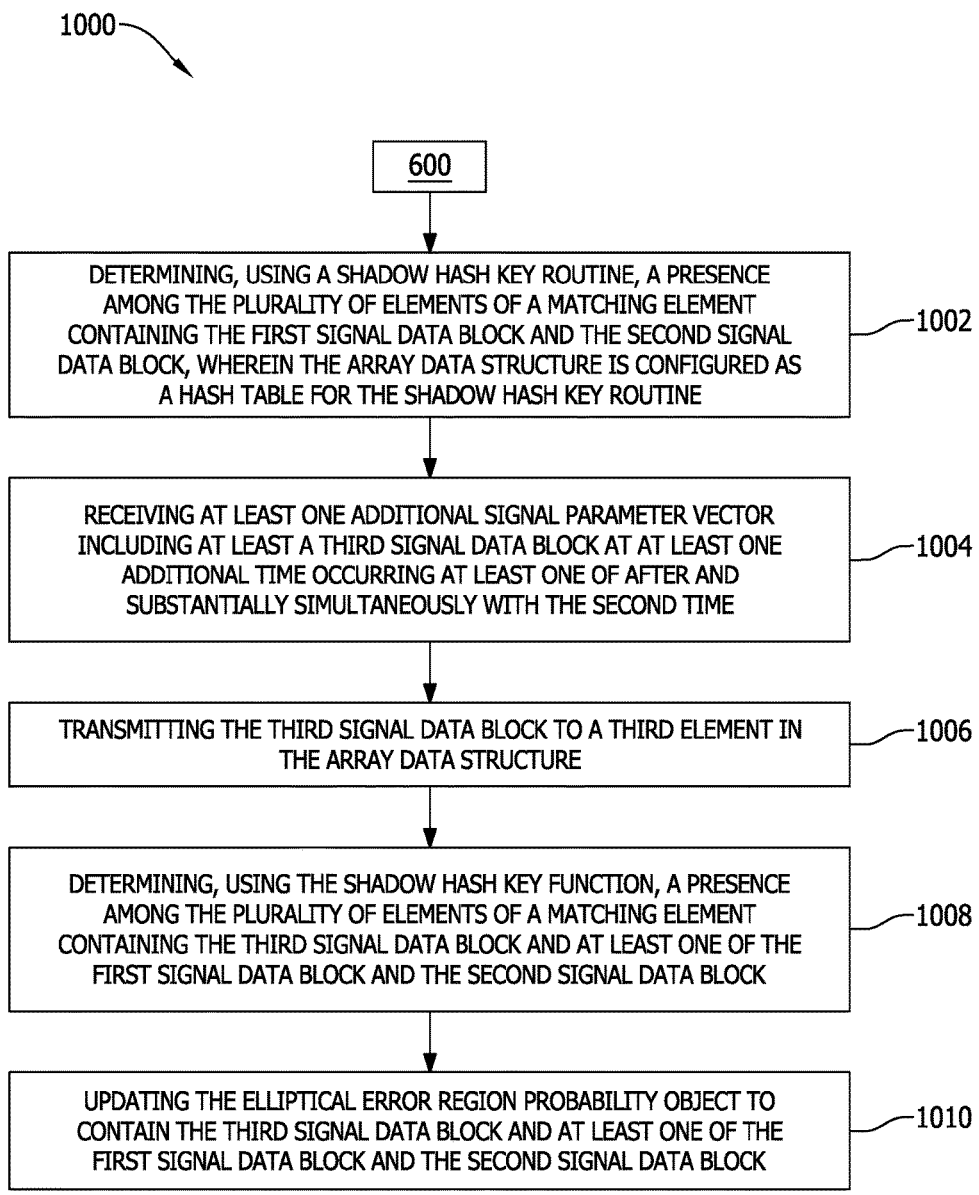
FIG. 10 is a flowchart of an alternative method of spatially filtering signal parameter vector data that may be used with the signal processing system shown in FIG. 3.

FIG. 10 is a flowchart of an alternative method 1000 of spatially filtering signal parameter vector data that may be used with signal processing system 100 shown in FIG. 3. In an alternative embodiment, method 1000 includes steps of method 600, as shown and described above with reference to FIG. 6. Method 1000 also includes determining 1002, using shadow hash key routine 408 executed by computing device 132, a presence among the plurality of elements 407 of a matching element 407 containing first signal data block 504 and second signal data block 506. Also, in determining 1002, array data structure 401 is configured as a hash table for shadow hash key routine 408. Method 1000 further includes receiving 1004, at computing device 132, at least one additional signal parameter vector 138 including at least a third signal data block 510 at an (at least one) additional time occurring at least one of after and substantially simultaneously with the second time.

Method 1000 also includes transmitting 1006, from computing device 132, the third signal data block 510 to a third element 407 in array data structure 401. Method 1000 further includes determining 1008, using shadow hash key routine 408, a presence among the plurality of elements 407 of a matching element 407 containing the third signal data block 510 and at least one of first signal data block 504 and second signal data block 506. Method 1000 also includes updating 1010, with computing device 132, the elliptical error region probability object (e.g., first 418 and/or second 420 elliptical error region probability object) to contain the third signal data block 510 and at least one of first signal data block 504 and second signal data block 506.

The above-described systems and methods for adding functional grid elements to stochastic sparse tree grids for spatial filtering enable efficient and high performance deinterleaving of signal parameter vector data generated using improved pre-processing front-end architectures and methods such as denoising and blind source separation. The above-described embodiments also facilitate high performance deinterleaving of signal parameter vectors containing new characteristics such as additional information. The above-described embodiments further enable efficient generation of useful deinterleaving information of signal parameter vectors during post-processing without requiring highly sophisticated, complex, and expensive processor architectures. The above-described systems and methods for adding functional grid elements to stochastic sparse tree grids for spatial filtering also facilitate high performance post-processing of both standard and new signal parameter vector data using a single platform employing a standard processor. The above-described embodiments further provide implementation in a single platform architecture which produces only AOA spatial information, rather than a more exact spatial location. The above-described systems and methods for adding functional grid elements to stochastic sparse tree grids for spatial filtering also facilitate combining non-standard signal parameters having widely varying accuracies and employing moving signal emitter spatial signal parameters as part of deinterleaving. The above-described embodiments also enable use of AOA-containing signal parameter vector data to generate accurate results from stochastic histogram methods using standard processors in less time relative to known spatial filtering systems and methods.

An exemplary technical effect of the above-described systems and methods for adding functional grid elements to stochastic sparse tree grids for spatial filtering includes at least one of the following: (a) enabling efficient and high performance deinterleaving of signal parameter vector data generated using improved pre-processing front-end architectures and methods such as denoising and blind source separation; (b) facilitating high performance deinterleaving of signal parameter vectors containing new characteristics such as additional information; (c) enabling efficient generation of useful deinterleaving information of signal parameter vectors during post-processing without requiring highly sophisticated, complex, and expensive processor architectures; (d) facilitating high performance post-processing of both standard and new signal parameter vector data using a single platform employing a standard processor; (e) providing implementation in a single platform architecture able to provide only AOA spatial information, rather than more exact spatial information; (f) facilitating combining non-standard signal parameters having widely varying accuracies and employing moving signal emitter platform spatial signal parameters as part of deinterleaving; and (g) enabling use of AOA-containing signal parameter vector data to generate accurate results from stochastic histogram methods using standard processors in less time relative to known spatial filtering systems and methods.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer-readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system (100) for spatially filtering signal parameter vector (138) data generated by at least one surveillance platform (6,34) from a plurality of signals (18,20) of a signal emitter (2,8,10,36,38), said system comprising:
  a sensor (103) configured to receive the plurality of signals;
  a pre-processor (104) coupled to the sensor and configured to generate a plurality of signal parameter vectors derived from the plurality of signals and including a first signal parameter vector and a second signal parameter vector, each signal parameter vector of the plurality of signal parameter vectors derived from one signal of the plurality of signals, wherein the first signal parameter vector includes a first signal data block (504) and the second signal parameter vector includes a second signal data block (506), and wherein the first and the second signal data blocks contain spatially-defined information for the signal emitter; and
  a computing device (132) coupled to the pre-processor and including a memory (134), wherein the computing device is programmed to:
    receive (602), from the pre-processor, the first signal parameter vector at a first time and the second signal parameter vector at a second time;
    transmit (604), to an array data structure (401) stored in the memory and having a plurality of elements (407) including a first element and a second element, the first signal data block to the first element and the second signal data block to the second element, wherein the array data structure is representative of a physical spatial domain (1,32) from which the plurality of signals are received by the sensor;
    determine (606) an elliptical error region probability object (416,418,420) containing the first and the second signal data blocks and having a center (514, 520) and a pair of axes, wherein the center is representative of a highest probability location of the signal emitter in the physical spatial domain at the second time, wherein the pair of axes is representative of a spatial error of the center at the second time, and wherein the elliptical error region probability object is stored in the memory in association with the array data structure;
    determine (708) at least one of a rate of change of an area of the elliptical error region probability object and a direction of change of the area of the elliptical error region probability object; and
    determine (710), based on at least one of the rate of change of the area of the elliptical error region probability object and the direction of change of the area of the error region probability, at least one of:

a presence of movement of the signal emitter;
a direction of movement of the signal emitter;
a velocity of the signal emitter; and
an acceleration of the signal emitter.

2. The system (100) in accordance with claim 1 further comprising a display (144) coupled to the computing device (132), wherein the computing device is further programmed to display (702), as human readable data via the display, at least one of the elliptical error region probability object (416,418,420), a value of at least one of the first (504) and second (506) signal data blocks, a value of the center (514,520), and a value of at least one axis of the pair of axes.

3. The system (100) in accordance with claim 1, wherein the computing device (132) is further programmed to direct (704) movement of at least one of the at least one surveillance platform (6,34) and a device (31,42) associated therewith at least one of toward and away from a location of the signal emitter (2,8,10,36,38) based on a determination of the elliptical error region probability object (416,418,420).

4. The system (100) in accordance with claim 1 further comprising at least one of:
at least one signal denoising module (118) configured to transmit a denoised signal (124) to the computing device (132); and
at least one blind source separation module (120) configured to transmit a blind source separated signal (129) to the computing device, wherein the computing device is further programmed to receive (706) at least one of the first and the second signal parameter vectors (138) as signal parameter vectors further derived from at least one of the denoised signal and the blind source separated signal.

5. The system (100) in accordance with claim 1, wherein the array data structure (401) includes a plurality of arrays (402,404,406), the plurality of arrays including a first array having a first number of elements (407) and a second array having a second number of elements greater than the first number of elements, and wherein the computing device (132) is further programmed to:
assign (802) at least one of the first (504) and second (506) signal data blocks to one of the first and the second arrays, said computing device further programmed to at least one of:
determine (804) the elliptical error region probability object (416,418,420) containing the first signal data block in the first array and the second signal data block in the first array;
determine (806) the elliptical error region probability object containing the first signal data block in the first array and the second signal data block in the second array;
determine (808) the elliptical error region probability object containing the first signal data block in the second array and the second signal data block in the first array; and
determine (810) the elliptical error region probability object containing the first signal data block in the second array and the second signal data block in the second array.

6. The system (100) in accordance with claim 1 further comprising a pulse denoising module (130) coupled to the sensor (103) and coupled to the computing device (132), wherein the computing device is further programmed to:
receive (902), at least one of before, after, and substantially with receipt of the second signal parameter vector (138), at least one unknown signal state space representation signal (139) derived from a denoised pulse (130) of at least one signal of the plurality of signals (18,20) and including at least one non-standard spatially-defined data point (524,532), wherein the pulse denoising module is configured to transmit the at least one unknown signal state space representation signal to the computing device;
transmit (904), to at least one element (407) of the plurality of elements in the array data structure (401), the at least one non-standard spatially-defined data point, said computing device further programmed to at least one of:
determine (906) the elliptical error region probability object (416,418,420) containing the non-standard spatially-defined data point and the first signal data block (504);
determine (908) the elliptical error region probability object containing the non-standard spatially-defined data point and the second signal data block (506); and
determine (910) the elliptical error region probability object containing the non-standard spatially-defined data point and the first and the second signal data blocks.

7. The system (100) in accordance with claim 6, wherein the computing device (132) is further programmed to determine (912), using a shadow hash key routine (408), a presence among the plurality of elements (407) of a matching element containing at least two of the first signal data block (504), the second signal data block (506), and the at least one non-standard spatially-defined data point (524, 532), wherein the array data structure (401) is configured as a hash table for the shadow hash key routine.

8. The system (100) in accordance with claim 1, wherein the computing device (132) is further programmed to determine (1002), using a shadow hash key routine (408), a presence among the plurality of elements (407) of a matching element containing the first signal data block (504) and the second signal data block (506), wherein the array data structure (401) is configured as a hash table for the shadow hash key routine.

9. The system (100) in accordance with claim 8, wherein the computing device (132) is further programmed to receive (1004) at least one additional signal parameter vector (138) including at least a third signal data block (510) at least one additional time occurring at least one of after and substantially simultaneously with the second time.

10. The system (100) in accordance with claim 9, wherein the computing device (132) is further programmed to:
transmit (1006), from the computing device, the third signal data block (510) to a third element (407) in the array data structure (401);
determine (1008), using the shadow hash key routine (408), the presence of the matching element containing the third signal data block and at least one of the first signal data block (504) and the second signal data block (506); and
update (1010) the elliptical error region probability object (416,418,420) to contain the third signal data block and at least one of the first signal data block and the second signal data block.

11. A method (600) of spatially filtering signal parameter vector (138) data generated by at least one surveillance platform (6,34) including a sensor (103) configured to receive a plurality of signals (18,20) from a signal emitter (2,8,10,36,38), said method comprising:
receiving (602), at a computing device (132), a first signal parameter vector at a first time and a second signal parameter vector at a second time occurring after the first time, the first signal parameter vector including a first signal data block (504) and the second signal parameter vector including a second signal data block (506), wherein the first and the second signal parameter vectors are derived from the plurality of signals, and wherein the first and the second signal data blocks contain spatially-defined information for the signal emitter;

transmitting (604), to an array data structure (401) stored in a memory (134) of the computing device and having a plurality of elements (407) including a first element and a second element, the first signal data block to the first element and the second signal data block to the second element, wherein the array data structure is representative of a physical spatial domain (1,32) from which the plurality of signals are received by the sensor;

determining (606), with the computing device, an elliptical error region probability object (416,418,420) containing the first and the second signal data blocks and having a center (514,520) and a pair of axes, wherein the center is representative of a highest probability location of the signal emitter in the physical spatial domain at the second time, wherein the pair of axes is representative of a spatial error of the center at the second time, and wherein the elliptical error region probability object is stored in the memory in association with the array data structure;

determining (708), with the computing device, at least one of a rate of change of an area of the elliptical error region probability object and a direction of change of the area of the elliptical error region probability object; and determining (710), with the computing device and based on at least one of the rate of change of the area of the elliptical error region probability object and the direction of change of the area of the elliptical error region probability object, at least one of:
  a presence of movement of the signal emitter;
  a direction of movement of the signal emitter;
  a velocity of the signal emitter; and
  an acceleration of the signal emitter.

12. The method (700) in accordance with claim 11 further comprising displaying (702) as human readable data, via a display (144) coupled to the computing device (132), at least one of the elliptical error region probability object (416,418, 420), a value of at least one of the first (504) and second (506) signal data blocks, a value of the center (514,520), and a value of at least one axis of the pair of axes.

13. The method (700) in accordance with claim 11 further comprising directing (704) movement of at least one of the at least one surveillance platform (6,34) and a device (31,42) associated therewith at least one of toward and away from a location of the signal emitter (2,8,10,36,38) based on a determination of the elliptical error region probability object (416,418,420).

14. The method (700) in accordance with claim 11, wherein receiving (602) the first and the second signal parameter vectors (138) comprises receiving (706) at least one of the first and the second signal parameter vectors as signal parameter vectors further derived from at least one of a denoised signal (124) and a blind source separated signal (129).

15. The method (800) in accordance with claim 11, wherein the array data structure (401) includes a plurality of arrays (402,404,406), the plurality of arrays including a first array having a first number of elements (407) and a second array having a second number of elements greater than the first number of elements, and wherein:

transmitting (604) comprises assigning (802), with the computing device (132), at least one of the first (504) and second (506) signal data blocks to one of the first and the second arrays; and determining (606) the elliptical error region probability object (416,418,420) comprises at least one of:
  determining (804) the elliptical error region probability object containing the first signal data block in the first array and the second signal data block in the first array;
  determining (806) the elliptical error region probability object containing the first signal data block in the first array and the second signal data block in the second array;
  determining (808) the elliptical error region probability object containing the first signal data block in the second array and the second signal data block in the first array; and
  determining (810) the elliptical error region probability object containing the first signal data block in the second array and the second signal data block in the second array.

16. The method (900) in accordance with claim 11 further comprising:

receiving (902), at the computing device (132) at least one of before, after, and substantially simultaneous with the second time, at least one unknown signal state space representation signal (139) derived from a denoised pulse (130) of at least one signal of the plurality of signals (18,20) and including at least one non-standard spatially-defined data point (524,532); and transmitting (904), to at least one element (407) of the plurality of elements in the array data structure (401), the at least one non-standard spatially-defined data point, wherein determining (606) the elliptical error region probability object (416,418,420) comprises at least one of:
  determining (906) the elliptical error region probability object containing the non-standard spatially-defined data point and the first signal data block (504);
  determining (908) the elliptical error region probability object containing the non-standard spatially-defined data point and the second signal data block (506); and
  determining (910) the elliptical error region probability object containing the non-standard spatially-defined data point and the first and the second signal data blocks.

17. The method (900) in accordance with claim 16 further comprising determining (912), using a shadow hash key routine (408) executed by the computing device (132), a presence among the plurality of elements (407) of a matching element containing at least two of the first signal data block (504), the second signal data block (506), and the at least one non-standard spatially-defined data point (524, 532), wherein the array data structure (401) is configured as a hash table for the shadow hash key routine.

18. The method (1000) in accordance with claim 11 further comprising determining (1002), using a shadow hash key routine (408) executed by the computing device (132), a presence among the plurality of elements (407) of a matching element containing the first signal data block (504)

and the second signal data block (506), wherein the array data structure (401) is configured as a hash table for the shadow hash key routine.

19. The method (1000) in accordance with claim 18 further comprising receiving (1004), at the computing device (132), at least one additional signal parameter vector (138) including at least a third signal data block (510) at least one additional time occurring at least one of after and substantially simultaneously with the second time.

20. The method (1000) in accordance with claim 19 further comprising:
   transmitting (1006), from the computing device (132), the third signal data block (510) to a third element (407) in the array data structure (401);
   determining (1008), using the shadow hash key routine (408), a presence among the plurality of elements of a matching element containing the third signal data block and at least one of the first signal data block (504) and the second signal data block (506); and
   updating (1010), with the computing device, the elliptical error region probability object (416,418,420) to contain the third signal data block and at least one of the first signal data block and the second signal data block.

21. A non-transient computer-readable memory (134) having computer-executable instructions embodied thereon, wherein when executed by a computing device (132), the computer-executable instructions cause the computing device to:
   receive (602), over time, a plurality of signal parameter vectors (138) including a first signal parameter vector at a first time and a second signal parameter vector at a second time, each signal parameter vector of the plurality of signal parameter vectors derived from one signal of a plurality of signals (18,20) transmitted to the computing device from a sensor (103) configured to receive the plurality of signals from a signal emitter (2,8,10,36,38), wherein the first signal parameter vector includes a first signal data block (504) and the second signal parameter vector includes a second signal data block (506);
   transmit (604), to an array data structure (401) stored in the memory (134) and having a plurality of elements (407) including a first element and a second element, the first signal data block to the first element and the second signal data block to the second element, wherein the array data structure is representative of a physical spatial domain (1,32) from which the plurality of signals are received by the sensor;
   determine (606) an elliptical error region probability object (416,418,420) containing the first and the second signal data blocks and having a center (514,520) and a pair of axes, wherein the center is representative of a highest probability location of the signal emitter in the physical spatial domain at the second time, wherein the pair of axes is representative of a spatial error of the center at the second time, and wherein the elliptical error region probability object is stored in the memory in association with the array data structure;
   determine (708) at least one of a rate of change of an area of the elliptical error region probability object and a direction of change of the area of the elliptical error region probability object; and
   determine (710), based on at least one of the rate of change of the area of the elliptical error region probability object and the direction of change of the area of the error region probability, at least one of:
      a presence of movement of the signal emitter;
      a direction of movement of the signal emitter;
      a velocity of the signal emitter; and
      an acceleration of the signal emitter.

22. The non-transient computer-readable memory (134) in accordance with claim 21, wherein the computer-executable instructions further cause the computing device (132) to determine (1002), using a shadow hash key routine (408), a presence among the plurality of elements (407) of a matching element containing the first signal data block (504) and the second signal data block (506), wherein the array data structure (401) is configured as a hash table for the shadow hash key routine.

* * * * *